(12) United States Patent
Arora et al.

(10) Patent No.: US 11,580,221 B2
(45) Date of Patent: Feb. 14, 2023

(54) MALWARE DETECTION AND CONTENT ITEM RECOVERY

(71) Applicant: DROPBOX, INC., San Francisco, CA (US)

(72) Inventors: Ishita Arora, San Francisco, CA (US); Anton Mityagin, San Francisco, CA (US); Ray Zhang, San Jose, CA (US); Sam Keller, Millbrae, CA (US); Stacey Sern, Edison, NJ (US)

(73) Assignee: Dropbox, Inc., San Francisco, CA (US)

( * ) Notice: Subject to any disclaimer, the term of this patent is extended or adjusted under 35 U.S.C. 154(b) by 380 days.

(21) Appl. No.: 15/394,385

(22) Filed: Dec. 29, 2016

(65) Prior Publication Data

US 2018/0189488 A1 Jul. 5, 2018

(51) Int. Cl.
*G06F 21/56* (2013.01)
*G06F 8/71* (2018.01)

(52) U.S. Cl.
CPC ............. *G06F 21/566* (2013.01); *G06F 8/71* (2013.01); *G06F 21/562* (2013.01); *G06F 21/563* (2013.01); *G06F 21/567* (2013.01); *G06F 21/568* (2013.01); *G06F 2221/034* (2013.01)

(58) Field of Classification Search
CPC .... G06F 21/566; G06F 21/567; G06F 21/568; G06F 21/563; G06F 21/562; G06F 8/71; G06F 2221/034
See application file for complete search history.

(56) References Cited

U.S. PATENT DOCUMENTS 7,934,262 B1 4/2011 Natanzon et al.
7,962,956 B1 6/2011 Liao et al.
(Continued)

FOREIGN PATENT DOCUMENTS

JP 2002351723 A 12/2002
JP 2004013607 A 1/2004
JP 2019505919 A 2/2019

OTHER PUBLICATIONS

International Search Report and Written Opinion for PCT Application No. PCT/US2017/061207 dated Jan. 24, 2018, 8 pages.
(Continued)

*Primary Examiner* — Beemnet W Dada
(74) *Attorney, Agent, or Firm* — DLA Piper LLP (US)

(57) ABSTRACT

Disclosed are systems, methods, and non-transitory computer-readable storage media for malware detection and content item recovery. For example, a content management system can receive information describing changes made to content items stored on a user device. The content management system can analyze the information to determine if the described changes are related to malicious software on the user device. When the changes are related to malicious software, the content management system can determine which content items are effected by the malicious software and/or determine when the malicious software first started making changes to the user device. The content management system can recover effected content items associated with the user device by replacing the effected versions of the content items with versions of the content items that existed immediately before the malicious software started making changes to the user device.

21 Claims, 14 Drawing Sheets

(56) References Cited

U.S. PATENT DOCUMENTS

| | | | | |
|---|---|---|---|---|
| 8,484,737 | B1* | 7/2013 | Swift | H04L 63/1441 |
| | | | | 709/224 |
| 8,689,209 | B2* | 4/2014 | Meller | G06F 8/654 |
| | | | | 717/173 |
| 9,317,686 | B1 | 4/2016 | Ye et al. | |
| 2006/0041942 | A1* | 2/2006 | Edwards | G06F 21/57 |
| | | | | 726/26 |
| 2007/0260643 | A1* | 11/2007 | Borden | G06F 17/30097 |
| 2013/0198141 | A1* | 8/2013 | Khan | G06F 16/2358 |
| | | | | 707/654 |
| 2017/0223031 | A1 | 8/2017 | Gu et al. | |
| 2018/0034835 | A1* | 2/2018 | Iwanir | H04L 63/1416 |

OTHER PUBLICATIONS

Notice of Acceptance for Patent Application from AU Patent Application No. 2017386900, dated Nov. 26, 2019, 24 pages.
Communication Pursuant to Rules 161(1) and 162 EPC for European Application No. 17805065.4 dated Aug. 6, 2019, 3 pages.
Notification of Reasons for Refusal for Japanese Application No. 2019-508898 dated Jun. 29, 2020, 9 pages.
Communication under Rule 71(3) EPC of Intention to Grant for European Application No. 17805065.4 dated Jun. 8, 2020, 68 pages.

* cited by examiner

MALWARE DETECTION AND CONTENT ITEM RECOVERY

BACKGROUND

Computing devices can be vulnerable to infection by malware created and distributed by malicious actors. One type of malware (e.g., ransomware) holds a user's files for ransom by encrypting the files on the user's computing device. The ransomware provides instructions to the user describing how the user can pay a fee (e.g., a ransom) to decrypt the user's files. If the user pays the ransom, the user's files are decrypted. If the user chooses to not pay the ransom, the encryption key used by the ransomware to encrypt the files may be deleted rendering the encrypted files inaccessible and useless to the user.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for malware detection and content item recovery. For example, a content management system can receive information describing changes made to content items stored on a user device. The content management system can analyze the information to determine if the described changes are related to malicious software on the user device. When the changes are related to malicious software, the content management system can determine which content items are effected by the malicious software and/or determine when the malicious software first started making changes to the user device. The content management system can recover effected content items associated with the user device by replacing the effected versions of the content items with versions of the content items that existed immediately before the malicious software started making changes to the user device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for improved malware detection and content item recovery. Often, a user is left with few options for recovering content items when the user's device is infected with ransomware or other type of malware. Typically, the user will pay the ransom to recover the user's content items or choose to forgo payment of the ransom and lose their content items forever. The systems disclosed herein provide for automatic detection of ransomware infections and/or recovery of content items without requiring the user to pay the ransom. While some of the features described herein can be performed in response to a user request, the malware detection and content item recovery features described herein can also be performed automatically to provide the user with quick recovery of the user's content items.

Figure 1:
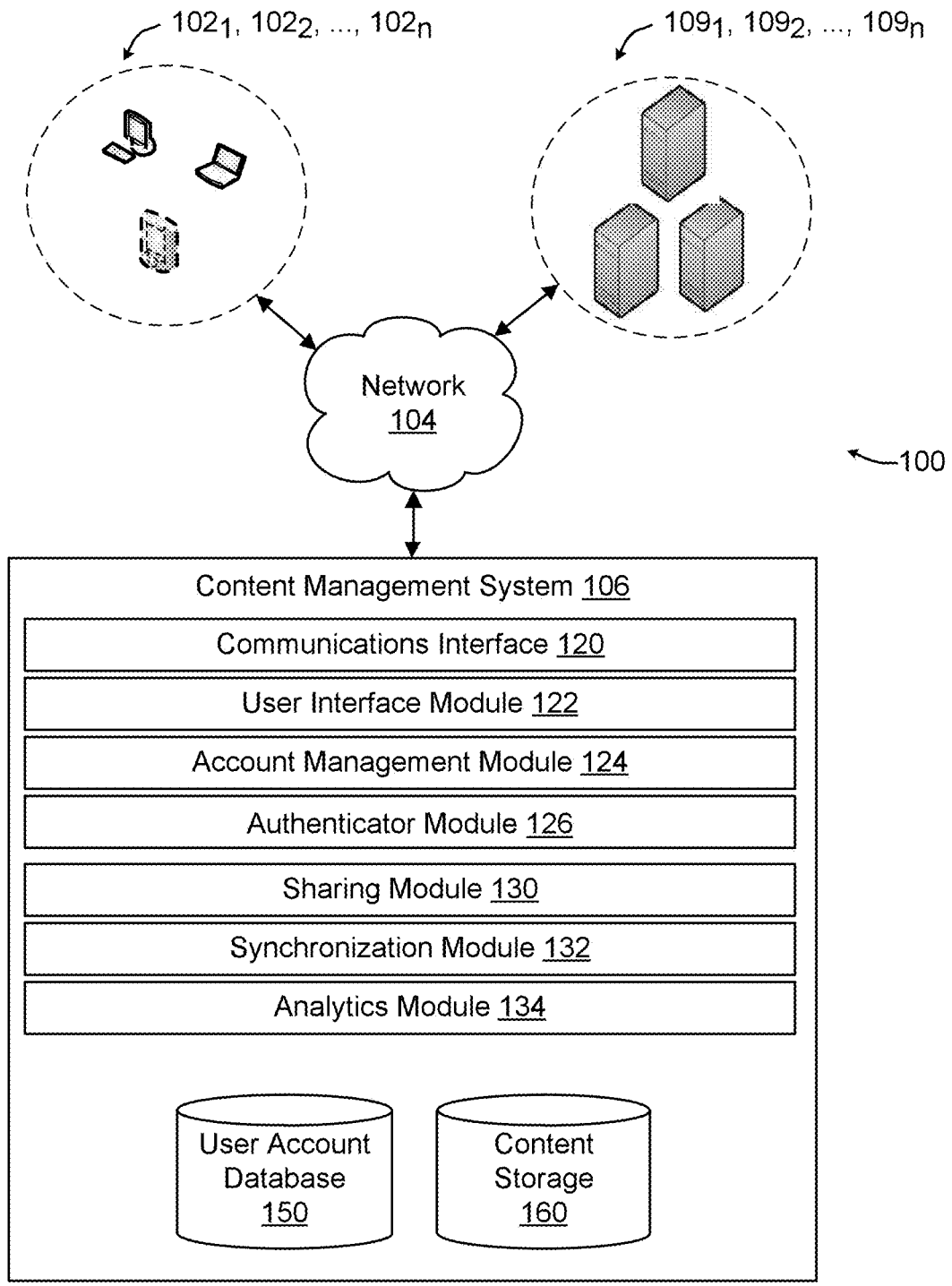
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, . . . , $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device 102, may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
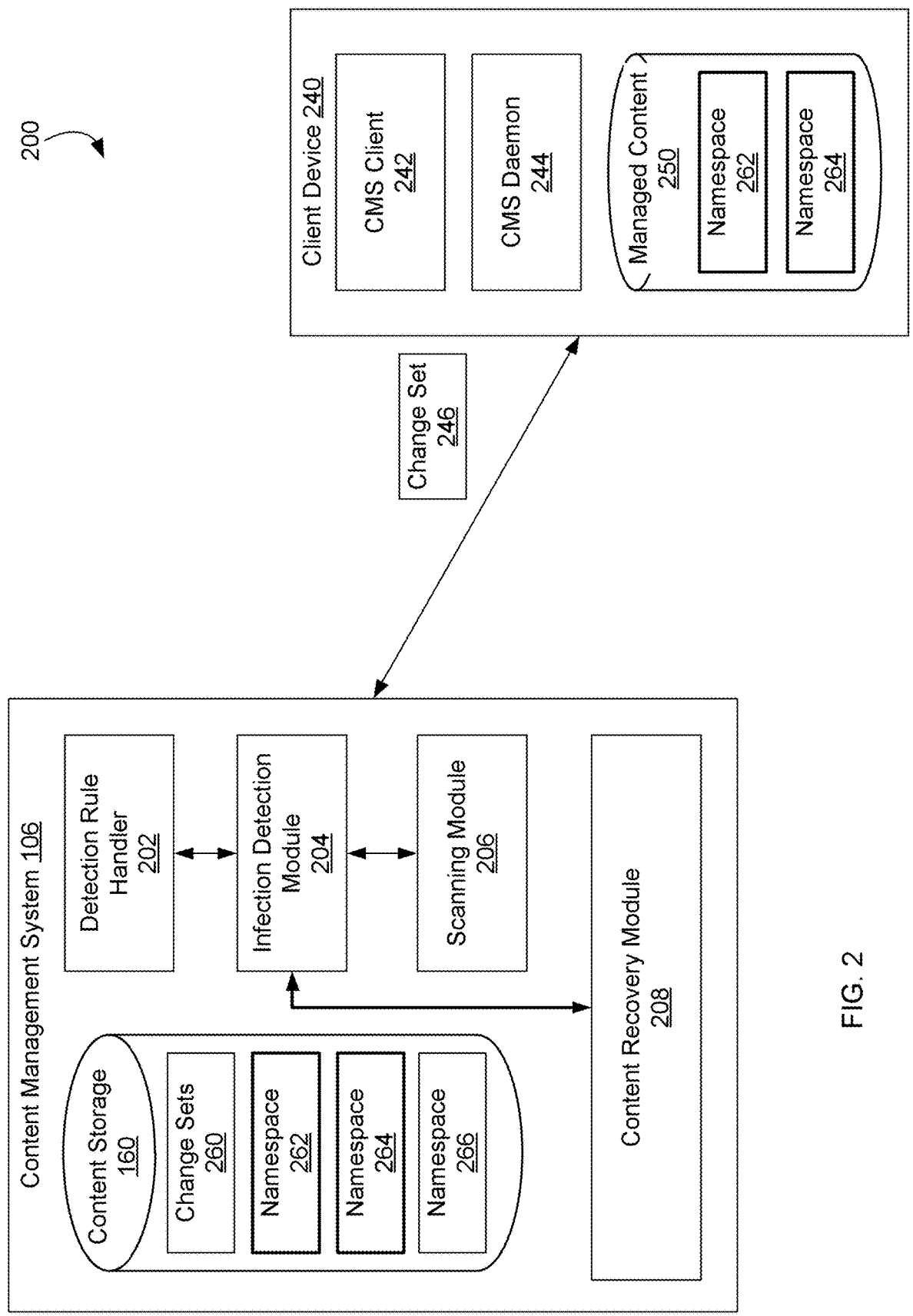
FIG. 2 is a block diagram of an example system for malware detection and content item recovery.

FIG. 2 is a block diagram of an example system 200 for malware detection and content item recovery. For example, system 200 can correspond to system 100 of FIG. 1, described above.

In some implementations, system 200 can include client device 240. For example, client device 240 can correspond to client device 102, described above. Client device 240 can, for example, be a laptop computer, tablet computer, smart phone, wearable device, and/or any other computing device. Although FIG. 2 illustrates a system 200 having only one client device 240 (e.g., client device 102$_i$), system 200 can include many client devices 240 (e.g., client devices 102$_i$-102$_n$) that interact with content management system 106. For example, users of content management system 106 can form groups of users corresponding to various work projects and/or teams. Each member of a project, team, or group may have a different client device 240 that communicates with content management system 106 to access data managed by content management system 106 and shared with members (e.g., users) of the project, team, or group.

In some implementations, client device 240 can include content management system (CMS) client 242. For example, CMS client 242 can be a native application of client device 240. For example, a native software application can be an application that is built specifically for the hardware and/or software configuration of client device 240. Thus, the graphical user interfaces (and other functionality) of CMS client 242 described below can be implemented using instructions, application programming interfaces (APIs), and other technologies native to client device 240. To generate the various graphical user interfaces below and/or implement various features described herein, CMS client 242 can request data (e.g., content items, notifications, etc.) from content management system 106 (e.g., user interface module 122) over a network connection (e.g., through network 104). Content management system 106 can obtain data from content storage 160 and/or other modules of content management system 106 and send the data to CMS client 242. CMS client 242 can then present the data on various graphical user interfaces generated by CMS client 242.

Alternatively, CMS client 242 can be a web client executed by a web browser running on client device 240. Thus, the graphical user interfaces (and other functionality) of CMS client 242 can be implemented using instructions, APIs, and other technologies that are not native to client device 240. For example, CMS client 242 can be built as a web application using non-native web code or instructions. Content management system 106 can serve CMS client 242 to a web browser on client device 240 and the web browser can execute CMS client 242 to present the graphical user interfaces (and other functionality) to the user, as described in detail below. To generate the various graphical user interfaces below and/or implement various features described herein, CMS client 242 (e.g., the web browser) can request various data views (e.g., graphical user interfaces, web pages, etc.) from content management system 106. Content management system 106 can generate the data views (e.g., the graphical user interfaces described below) for presenting content management system data (e.g., content items, notifications, comments, tasks, etc.) and send the data views to CMS client 242 over a network connection (e.g., through network 104). For example, content management system 106 can obtain data from content storage 106 and/or software modules of content management system 106, generate the data views based on the data, and send the data views to CMS client 242. CMS client 242 can then present the project folder views on a display of client device 240.

In some implementations, client device 240 can include CMS daemon 244. For example, CMS daemon 244 can be a client of content management system 106 that maintains synchronization of data between content management system 106 and client device 240. For example, client device 240 can include managed content 250. Managed content 250 can be a portion of the file system on client device 240 managed by content management system 106 and/or CMS daemon 244. CMS daemon 244 and/or content management system 106 can synchronize content items stored in managed content 250 with content items stored in content storage 160, for example.

In particular, when the user of client device 240 has permission to access namespace 262 and/or namespace 264, content management system 106 and/or CMS daemon 244 can synchronize the state (e.g., content items, content item metadata, etc.) of namespace 262 and/or namespace 264 on content management system 106 with the state of namespace 262 and/or namespace 264 stored in managed content 250 on client device 240. By synchronizing the state or content of the namespaces between content management system 106 and client device 240, the user of client device 240 can access the content items associated with each namespace both locally on client device 240 and remotely through content management system 106.

For example, a namespace can correspond to a folder, collection, or grouping of content items managed by content management system 106. A namespace can correspond to a team, project, or other collaborative group of users. Content management system 106 can associate one or more namespaces with a content item (e.g., the namespace can be identified in metadata associated with a content item) managed by content management system 106. Content management system 106 can retrieve and/or synchronize content items and/or metadata based on which namespaces the requesting user device (e.g., user) has permission to access. In the example of FIG. 2, client device 240 (e.g., the corresponding user) has permission to access namespace 262 and/or namespace 264 so content management system 106 synchronizes the content items, metadata, and other state information associated with namespaces 262 and/or 264 with client device 240.

In some implementations, client device 240 can send change set 246 to content management system 106. For example, client device 240 can send change set 246 to content management system 106 when synchronizing content in managed content 250 with content stored in content storage 160. A change set can include data or instructions describing changes made at client device 240. For example, CMS daemon 244 can generate change set 246 to inform content management system 106 of changes made to managed content 250 on client device 240. CMS daemon 244 can add entries to change set 246 over time. Thus, change set 246 can include entries describing all of the changes made to managed content 250 within a time period. For example, when client device 240 deletes a content item from managed content 250, CMS daemon 244 can generate an entry to a change set that indicates that the content item has been deleted. When client device 240 adds a content item from managed content 250, CMS daemon 244 can generate an entry to a change set that indicates that the content item has been added. The entry (e.g., a string of characters) can include a device identifier for client device 240, a namespace identifier corresponding to the namespace with which the change is associated, a descriptor for the change operation performed (e.g., "delete", "add", "modify", etc.), a content item identifier (e.g., a file name, file name extension, storage location, etc.) for the content item effected by the operation, and/or a timestamp indicating when the change operation was performed. CMS daemon 244 can periodically send change set 246 to content management system 106 so that content management system 106 can make updates to content storage 160 based on the changes described in the changes set. After sending change set 246 to content management system 106, CMS daemon 244 can generate a new change set 246 to keep track of new changes made to managed content 250. Thus, CMS daemon 244 can send many change sets 246 over time to content management system 106 describing the changes to managed content 250 over time.

In some implementations, content management system 106 can receive change set 246 from client device 240. For example, content management system 106 can receive multiple change sets 246 over time, as described above. When content management system 106 receives change set 246 from client device 240, content management system 106 can store change set 246 in a collection of change sets 260. When content management system 106 receives change set 246, content management system 106 can make the changes described in change set 246. For example, content management system can add, delete, modify, move, etc., content items in content storage 160 according to the change operations described in change set 246.

In some implementations, content management system 106 can include modules for detecting a malware attack on client device 140. For example, content management system 106 can include lightweight modules 202 and 204 for detecting evidence or indications of a malware attack included in change set 246. Content management system 106 can include scanning module 206 for performing a more comprehensive or in-depth scan of change sets 260 to determine the scope and/or start time of the malware attack, as described further below.

In some implementations, content management system 106 can include malware detection rule handler 202. When content management system 106 receives change set 246, detection rule handler 202 can process change set 246 to determine whether each entry in change set 246 satisfy a detection rule handled by detection rule handler 202. A change entry in change set 246 can be considered a suspicious entry when the change entry satisfies a malware detection rule. For example, content management system 106 can include multiple detection rule handlers 202. Each detection rule handler 202 can be configured to compare change entries in change set 246 to a specific malware detection rule or condition to determine whether a change entry is a suspicious entry (e.g., includes characteristics related to known malicious software).

In some implementations, detection rule handler 202 can determine suspicious entries in change set 246 by comparing entries in change set 246 to a known malware file naming convention (e.g., file name, file extension, etc.). For example, content management system 106 can maintain a blacklist of known malware (ransomware) file name extensions. Detection rule handler 202 can compare each change entry in change set 246 to the file name extensions in the blacklist to determine whether a change entry is a suspicious entry (e.g., related to a malware attack on client device 240). For example, if the black list includes the file name extension ".ransom" associated with known ransomware software, detection rule handler 202 can compare the content item identifier in each change entry in change set 246 with the string ".ransom" to determine whether the change entry is associated with a content item having a ".ransom" extension. When change set 246 includes an entry that indicates a content item having an identifier "file1.ransom," has been added to managed content 250, detection rule handler 202 can determine that the entry is a suspicious entry (e.g., likely related to malware).

Similarly, detection rule handler 202 can compare change entries in change set 246 to determine whether a malware instruction file has been added to managed content 250 on client device 240. For example, when ransomware encrypts content items on client device 240, the ransomware may generate a help file (e.g., help.txt, help.pdf, instructions.pdf, etc.) that provides instructions to the user of client device 240 describing how to make the ransom payment to decrypt the encrypted content items on client device 240. Content management system 106 can include a detection rule handler 202 that compares strings corresponding to known instruction file naming conventions (e.g., "help," "instructions," etc.) to change entries in change set 246 to determine whether a ransomware help file has been stored on client device 240. For example, when change set 246 includes a change entry describing adding a content item having the identifier "help.txt," detection rule handler 202 can compare the identifier "help.txt" to the string "help" and determine based on the comparison that the change entry is a suspicious entry (e.g., is likely related to a malware attack).

In some implementations, content management system 106 can include infection detection module 204. For example, when detection rule handler 202 determines that a change entry in change set 246 is suspicious, detection rule handler 202 can send a message to infection decision module 204 indicating that detection rule handler 202 found a suspicious change entry in change set 246. The message can include the device identifier for the device that sent change set 246 to content management system 106, the namespace associated with the change entry, and/or the timestamp associated with the change entry. In some implementations, detection rule handler 202 can send a message to infection decision module 204 for each suspicious change entry found in change set 246.

In some implementations, infection detection module 204 can determine whether to perform a full scan of the change sets 260 associated with client device 240. For example, infection detection module 204 can keep a count of the number of messages received from detection rule handler 202 (e.g., a count of suspicious change entries). When the number of messages received (e.g., number of suspicious change entries identified) within a period of time (e.g., 1 minute, 5 minutes, 7 minutes, etc.) exceeds a threshold number (e.g., 7, 10, etc.), infection detection module 204 can trigger a full scan of all change sets 260 associated with client device 240. Infection detection module can send a scan request message to scanning module 206 to request a full scan of all change sets 260 associated with client device 240. For example, the scan request message can include the device identifier for the infected client device 240, the namespaces associated with the suspicious change entries, and/or a timestamp for the suspicious change entries For example, infection detection module 204 can determine the device identifier for the infected client device 240, the namespaces associated with the suspicious change entries, and/or a timestamp for the suspicious change entries based on the messages received from each detection rule handler 202.

In some implementations, content management system 106 can include scanning module 206. For example, scanning module 206 can perform a scan of change entries in change sets 260 to determine whether client device 240 has been attacked by malicious software (e.g., malware, ransomware, etc.). Scanning module 206 can perform a scan of change sets 260 associated with client device 240 in response to a request received from infection detection module 204. For example, scanning module 206 can receive a scan request message that includes an identifier for client device 240, identifiers for namespaces associated with client device 240, and/or timestamps corresponding to suspicious change entries found by detection rule handler 202 and/or infection detection module 204.

Alternatively, scanning module 206 can perform a scan of change sets 260 associated with client device 240 in response to a request received from client device 240. For example, a user of client device 240 may suspect that client device 240 has been infected with malware (e.g. ransomware) and request the content management system perform a scan of change sets 260 to determine if client device 240 has been infected with malware. The user of client device 240 can select a button or other graphical element presented on a graphical user interface of content management system 106 to cause scanning module 206 to scan change sets 260 associated with client device 240. For example, the graphical user interface can be presented on a display of client device 240 by CMS client 242. In response to receiving the selection of the graphical element, CMS client 242 can send a scan request message to content management system 106 that includes the identifier for client device 240, identifiers for namespaces associated with client device 240, and a timestamp indicating the date and/or time of the scan request.

In some implementations, scanning module 206 can scan change sets 260 to determine whether client device 240 has been infected by malware. Scanning module 206 can initiate a scan of change sets 260 starting at a date and/or time corresponding to the timestamp specified in the received scan request. For example, scanning module 206 can obtain change sets 260 associated with the user device (e.g., client device 240) identified in the received scan request. Scanning module 206 can locate change entries within change sets 260 that correspond to the timestamp specified in the scan request.

Starting with the change entries corresponding to the timestamp specified in the scan request, scanning module 206 can move from change entry to change entry forward in time and/or backward in time to determine the scope of the changes caused by the malware infecting client device 240. For example, scanning module 206 can move forward in time and backward in time comparing change entries in change sets 206 to the blacklist of malware file names and/or file extensions to determine which change entries are related to malicious software. By scanning both forward in time and backward in time, scanning module 206 can determine a time (e.g., start time) of the earliest malware related change entry on client device 240 and a time (e.g., end time) of the last malware related change entry on client device 240.

In some implementations, scanning module 206 can analyze the change entries to determine whether a large number of content item deletions have occurred around the time specified in the scan request. For example, scanning module 206 can be configured with a threshold number of deletions (e.g., 1000, 500, 200, etc.). Scanning module 206 can analyze change sets 260 to determine how many content item deletions have occurred on client device 240 between the start time and the end time of the malware attack. When scanning module 206 determines that the number of content item deletions is less than the threshold number deletions, scanning module 206 can determine that a malware attack has not occurred. When scanning module 206 determines that the number of content item deletions exceeds the threshold number deletions, scanning module 206 can continue analyzing change sets 260 to determine whether a malware infection has occurred.

In some implementations, scanning module 206 can determine a malware attack has occurred based on a ratio of content item additions to content item deletions. For example, scanning module 206 can compare each change entry in change sets 260 associated with client device 240 to determine whether the change entry is a suspicious change entry that adds a malicious software related content item. Scanning module can, for example, compare each change entry to the blacklist of file names and/or file extensions to determine if the change entry adding a content item is related to known malicious software or ransomware. Scanning module 206 can determine the number of change entries that indicate a content item having a name and/or extension associated with malware was added to client device 240. Scanning module 206 can then determine a ratio of malware related additions to content item deletions. For example, scanning module 206 can calculate the ratio by dividing the number of malware related additions by the number of content item deletions within the determined period of time. When the ratio is within a threshold percentage of one (1) (e.g., plus or minus 10%), then scanning module 206 can determine that client device 240 has been attacked by malware (e.g., ransomware).

Alternatively, scanning module 206 can calculate a ratio of ransomware related extensions to total number of file changes indicated in change sets 260. For example, in addition to determining the number of ransomware related additions indicated in change sets 260, scanning module 206 can determine the total number of content item changes (e.g., total number of change entries) in scanning module 206. Scanning module 206 can then calculate the ratio by dividing the number of malware related additions by the total number of content item changes (e.g., total number of change entries) within the determined period of time. When the ratio exceeds a threshold number (e.g., 0.1, 10%, etc.), then scanning module 206 can determine that client device 240 has been attacked by malware (e.g., ransomware).

In some implementations, scanning module 206 can notify infection detection module 204 in response to determining that client device 240 has been attacked by malware. For example, scanning module 206 can send a message to infection detection module 204 indicating that a malware attack has occurred. The message can include identifiers for the namespaces effected by the malware attack, an identifier for the infected user device (e.g., client device 240), and a timestamp for the earliest malware related change entry in change sets 206.

In response to receiving the message from scanning module 206, infection detection module 204 can send an infection detection message to client device 240 indicating that malware has been detected on client device 240. For example, infection detection module 206 can cause content management system 106 to send an email message, notification, instant message, or other type of infection detection message to client device 240 to inform the user that content management system 106 has detected malware on client device 240. The infection detection message can include a description of the malware infecting client device 240, an example of content items effected by the malware infection, a date and/or time when the first malware related change entry occurred in change sets 260, and/or a selectable element (e.g., link, URL, button, etc.) for initiating recovery of the effected content items. When the infection detection message is an email message, an email client (e.g., web client in browser, native email client, etc.) on client device 240 can present the email message. When the infection detection message is a notification, CMS client 242 can present a graphical representation of the notification on a display of client device 240.

In response to receiving the message from scanning module 206, infection detection module 204 can suspend synchronization of content items with client device 240. As described above, content management system 106 can synchronize content items and/or content item metadata stored in content storage 160 with content items and/or content item metadata stored in managed content 250 of client device 240. To prevent the malware installed on client device 240 from affecting (e.g., encrypting, corrupting, etc.) content items recovered by content recovery module 208, as described below, content management system 106 can stop synchronizing content items with client device 240 until the malware is removed from client device 240. Content management system 106 can suspend the synchronization of content items automatically. Content management system 106 can suspend the synchronization of content items in response to receiving instructions from client device 240. For example, content management system 106 can send a notification or message to client device 240 to inform the user of client device 240 that client device 240 is infected with malicious software. The user of client device 240 can select a graphical element (e.g., a button) presented on a display of client device 240 to suspend synchronization of content items with content management system 106. Client device 240 can send instructions (e.g., a message, a request, etc.) to content management system 106 to suspend synchronization of content items between content management system 106 and client device 240. In response to receiving the synchronization suspension instructions, content management system 106 can suspend content item synchronizations between client device 240 and content management system 106. By suspending synchronization between content management system 106 and client device 240, the malware on client device 240 will not have an opportunity to encrypt or corrupt the recovered content items.

In some implementations, content management system 106 can include content recovery module 208. For example, content recovery module 208 can recover content items effected by malicious software by restoring a version of the content items that existed immediately before the malware attack. For example, a user of client device 240 can select the selectable element (e.g., URL, link, button, etc.) included in the infection detection message generated by infection detection module and presented on client device 240 to cause content recovery module 208 to initiate recovery of content items that the malware (e.g., ransomware) encrypted or otherwise modified on client device 240. Upon selection of the selectable element, CMS client 242 (or an email client) can send a recovery request message to content management system 106 to cause content management system 106 to recover content corresponding to the namespaces associated with client device 240. The recovery request message can, for example, include the identifier for client device 240, identifiers for the namespaces to be recovered, and/or a timestamp indicating to which point in time content recovery module 208 should recover (e.g., revert, restore, etc.) content items. When content management system 106 receives the recovery request message, content management system 106 can invoke content recovery module 208 and pass the identifier for client device 240, identifiers for the namespaces to be recovered, and/or a timestamp indicating to which point in time content recovery module 208 should recover (e.g., revert, restore, etc.) content items to content recovery module 208.

Alternatively, the recovery request message can include a reference to recovery data stored by infection detection module 204 that includes the identifier for client device 240, identifiers for the namespaces to be recovered, and/or a timestamp indicating to which point in time content recovery module 208 should recover (e.g., revert, restore, etc.) content items. When content management system 106 received the recovery request message, content management system 106 can retrieve the referenced recovery data and invoke content recovery module 208 by passing the recovery data (e.g., client device identifier, namespace identifiers, timestamp, etc.) to content recovery module 208.

In some implementations, content recovery module 208 can recover content items affected by malware on client device 240. For example, when invoked, content recover module 208 can restore content items deleted during the malware attack. For example, content recovery module 208 can determine content items that were added and/or deleted during the time period (e.g., start time—end time) of the malware attack based on change sets 260. Content recovery module 208 can, for example, delete from content storage 160 content items that were added to namespaces (e.g., namespace 262, namespace 264, etc.) associated with client device 240.

Content recovery module 208 can restore to content storage 160 content items that were deleted from namespaces associated with client device 240. For example, content recovery module 208 can determine the identifiers for the deleted content items during the time period of the malware attack. Content recovery module 208 can determine versions of the deleted content items corresponding to the latest version of the content items that existed immediately before the time corresponding to the timestamp received by content recovery module 208 indicating when the malware attack began. Content recovery module 208 can restore the determined versions of the content items to the respective namespaces associated with client device 240 so that the restored versions of the content items become the current version of the content items in content storage 160.

In some implementations, content management system 106 can resume synchronization of content items with client device 240. For example, after content recover module 208 recovers or restores content items that were affected by the malware attack in content storage 160, content management system 106 can send a message to client device 240 indicating that the content items affected by the malware attack are restored and prompting the user of client device 240 to remove the malicious software from client device 240. The prompt can provide a selectable graphical element that the user can select to indicate that the malware has been removed from client device 240 and that content management system 106 can resume synchronizing content items with client device 240. For example, the message including the prompt and selectable graphical element can be an email message, instant message, or notification sent to an appropriate software client (e.g., CMS client 242, email client, instant messaging client, etc.) on client device 240.

When the user selects the selectable graphical element to confirm that that malware has been removed from client device 240, client device 240 (e.g., the software client presenting the message) can send a malware removal confirmation message to content management system 106 indicating that the malware has been removed from client device 240 and that content management system 106 can resume synchronizing content items with client device 140. In response to receiving the malware removal confirmation message, content management system 106 can resume synchronizing content items with client device 240. For example, content management system 106 can synchronize the restored content items associated with namespace 262 and namespace 264 with managed content 250 on client device 240. Thus, content management system 106 can recover content items thought to be lost as a result of a malware (e.g., ransomware) attack on client device 240.

Figure 3:
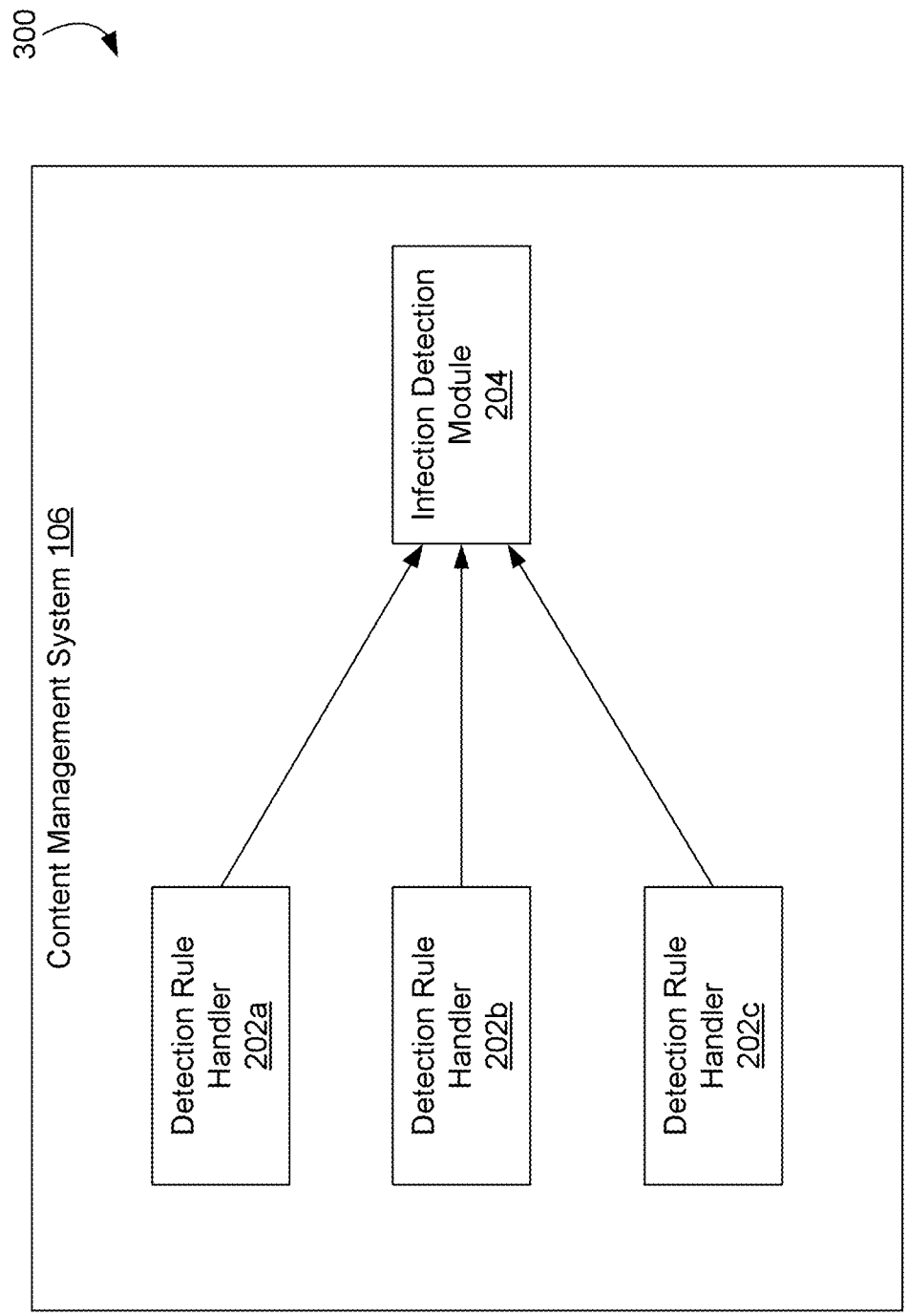
FIG. 3 is a block diagram of an example system having multiple malware detection rule handlers.

FIG. 3 is a block diagram of an example system 300 having multiple malware detection rule handlers. For example, system 300 can correspond to system 200, described above. As described above, content management system 106 can include multiple detection rule handlers 202 (e.g., 202a, 202b, 202c, etc.). Each detection rule handler can be configured to handle a different rule. For example, detection rule handler 202a can be configured with a rule that causes detection rule handler 202a to send a suspicious entry message to infection detection module 204 when detection rule handler 202a finds a change set entry that matches a known malware file name extension. Detection rule handler 202b can be configured with a rule that causes detection rule handler 202b to send a suspicious entry message to infection detection module 204 when detection rule handler 202b finds an entry that matches known malware instruction file naming conventions. Detection rule handler 202c can be configured with a rule that causes detection rule handler 202c to send a suspicious entry message to infection detection module 204 when detection rule handler 202c finds an entry that matches another known malware file name extension. New detection rule handlers 202 can be added whenever a new detection rule is needed to allow content management system 106 to detect malware based on change entries in the change sets reported by client device 240.

As descried above, infection detection module 204 can determine that client device 240 may be infection with malware based on the messages from detection rule handlers 202a, 202b, and/or 202c. For example, infection detection module 204 can determine that client device 240 is probably being attacked by malicious software when the number of messages received from detection rule handlers 202 is greater than a threshold number of messages, as described above.

Figure 4:
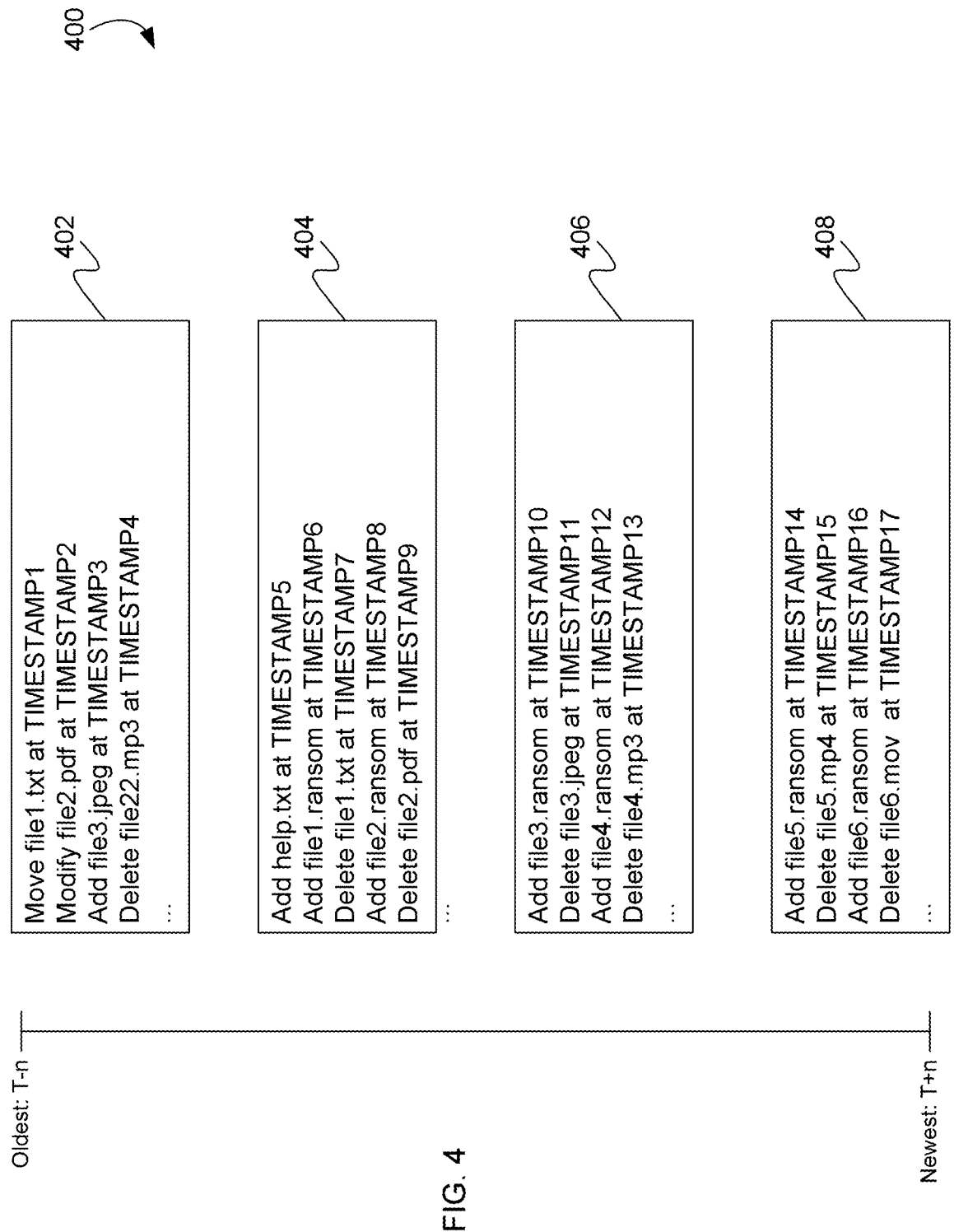
FIG. 4 illustrates an example sequence of change sets sent from a client device to a content management system.

FIG. 4 illustrates an example sequence of change sets 400 sent from client device 240 to content management system 106. For example, change sets 400 can correspond to change sets 260 of FIG. 2. Change set 402, 404, 406, and/or 408 can correspond to an individual change set 246 sent from client device 240 to content management system 106. Each change set 402, 404, 406, and/or 408 can indicate changes made to content items on client device 240 over time. For example, at a time 'T−1', CMS daemon 244 can send change set 402 to content management system 106 describing the changes to managed content 250 on client device 240. Change set 402 can describe content items that have been moved, modified, added, or deleted within managed content 250. CMS daemon 244 can subsequently send change set 404, change set 406, and/or change set 408 describing additional changes made to managed content 350 on client device 240.

When change sets 402, 404, 406 and/or 408 are received at content management system 106, detection rule handlers 202 can analyze each change set as it arrives at content management system 106 to determine whether suspicious change entries exist within each change set. For example, a detection rule handler 202 can be configured to detect change entries that indicate content items having a content item identifier (e.g., name) that includes the ".ransom" extension. Detection rule handler 202 can compare each entry in change set 402 to the ".ransom" extension, for example. Since there are no change entries in change set 402 that have the ".ransom" extension, detection rule handler 202 will not send any suspicious entry messages to infection detection module 204. However, when detection rule handler 202 compares each entry of change set 404 to the ".ransom" extension, detection rule handler 202 will send at least two suspicious change entry messages to infection detection module 204 because change set 404 includes change entries indicating that file1.ransom and file2.ransom have been added to managed content 250 on client device 240. Similarly, detection rule handler 202 will find and report suspicious entries in change set 406 and change set 408. Thus, infection detection module 204 may invoke scanning module 206 to perform a full scan of change sets 400 to determine whether client device 240 is infected with malware.

When scanning module 206 is invoked, scanning module 206 can analyze stored change sets associated with client device that is the target of the suspected ransomware attack. For example, change sets 402-408 can be stored in change sets 260 when received by content management system 106. When invoked, scanning module 206 can receive the device identifier for client device 240, namespaces associated with the suspected attack, and a timestamp corresponding to a suspected change entry. Scanning module 206 can then move forward and backward in time through the change sets 260 to determine the if a malware attack has actually occurred and to determine the scope of the attack.

For example, if the timestamp provided to scanning module 206 by infection detection module 204 corresponds to TIMESTAMP8, scanning module 206 can move forward in time through change sets 404, 406, and 408 to determine other content items (e.g., based on name extension) that have been encrypted and/or deleted by the ransomware.

Scanning module 206 can also move back in time through change sets 260 to determine the start of the ransomware attack. For example, scanning module 206 can move backward in time through change set 404 and change set 402 to determine the first change entry associated with the ransomware. In this example, the first time entry associated with ransomware (e.g., Add help.txt) occurred at a time corresponding to TIMESTAMP5. Now that scanning module 206 has identified the start of the ransomware attack and the content items affected by the attack, scanning module 206 can provide this information to content recovery module 208 (e.g., through infection detection module 204) so that content recovery module 208 can restore versions of the affected content items that existed immediately before the time when the ransomware attack started (e.g., the time corresponding to TIMESTAMP5).

Figure 5:
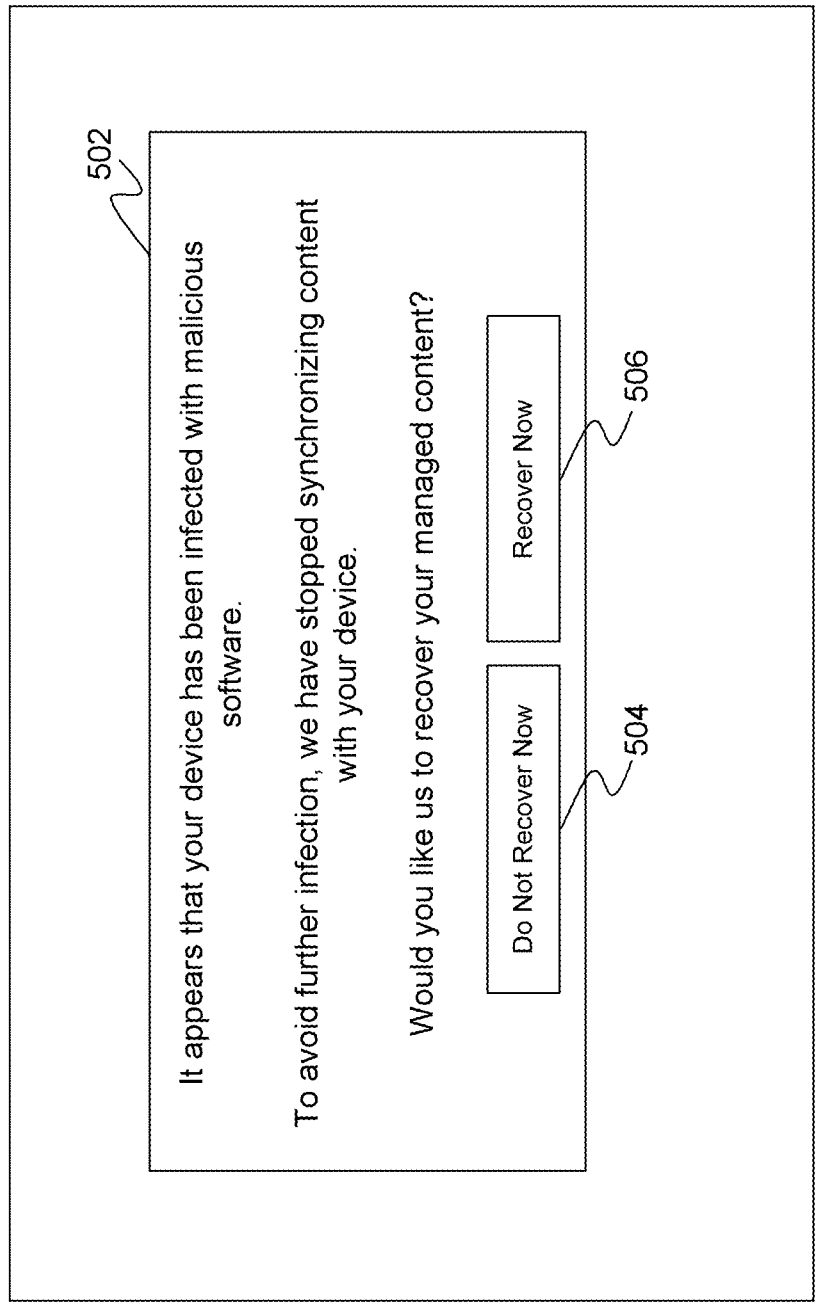
FIG. 5 illustrates an example graphical user interface for prompting a user to initiate content item recovery after a malware attack is detected.

FIG. 5 illustrates an example graphical user interface 500 for prompting a user to initiate content item recovery after a malware attack is detected. For example, GUI 500 can be presented by CMS client 242 after receiving a message from content management system 106 indicating that ransomware has been detected on client device 240. Alternatively, GUI 500 can be presented by an email client, instant messaging client, or other messaging client after receiving a message (e.g., email, instant message, chat message, etc.) from content management system 106 indicating that ransomware has been detected on client device 240.

In some implementations, GUI 500 can include notification 502. For example, notification 502 can present a description of the detected malware infection and a message prompting the user to initiate content item recovery. Notification 502 can include selectable graphical element 504. For example, the user can select graphical element 504 to indicate that the user does not wish to recover content items at the time of the selection. For example, graphical element 504 can correspond to a link (e.g., a uniform resource locator, web address, etc.) such that when graphical element 504 is selected, the link causes content management system 106 to receive a message indicating that the user does not wish to initiate content item recovery.

In some implementations, notification 502 can include graphical element 506 for initiating content item recovery. For example, the user can select graphical element 506 to indicate that the user does wish to initiate recovery of the malware affected content items. For example, graphical element 504 can correspond to a link (e.g., a uniform resource locator, web address, etc.) such that when graphical element 504 is selected, the link causes content management system 106 to receive a message indicating that the user wishes to initiate content item recovery. In response to receiving the message, content management system 106 can invoke content recovery module 208 to initiate recovery of the affected or ransomed content items, as described above.

Figure 6:
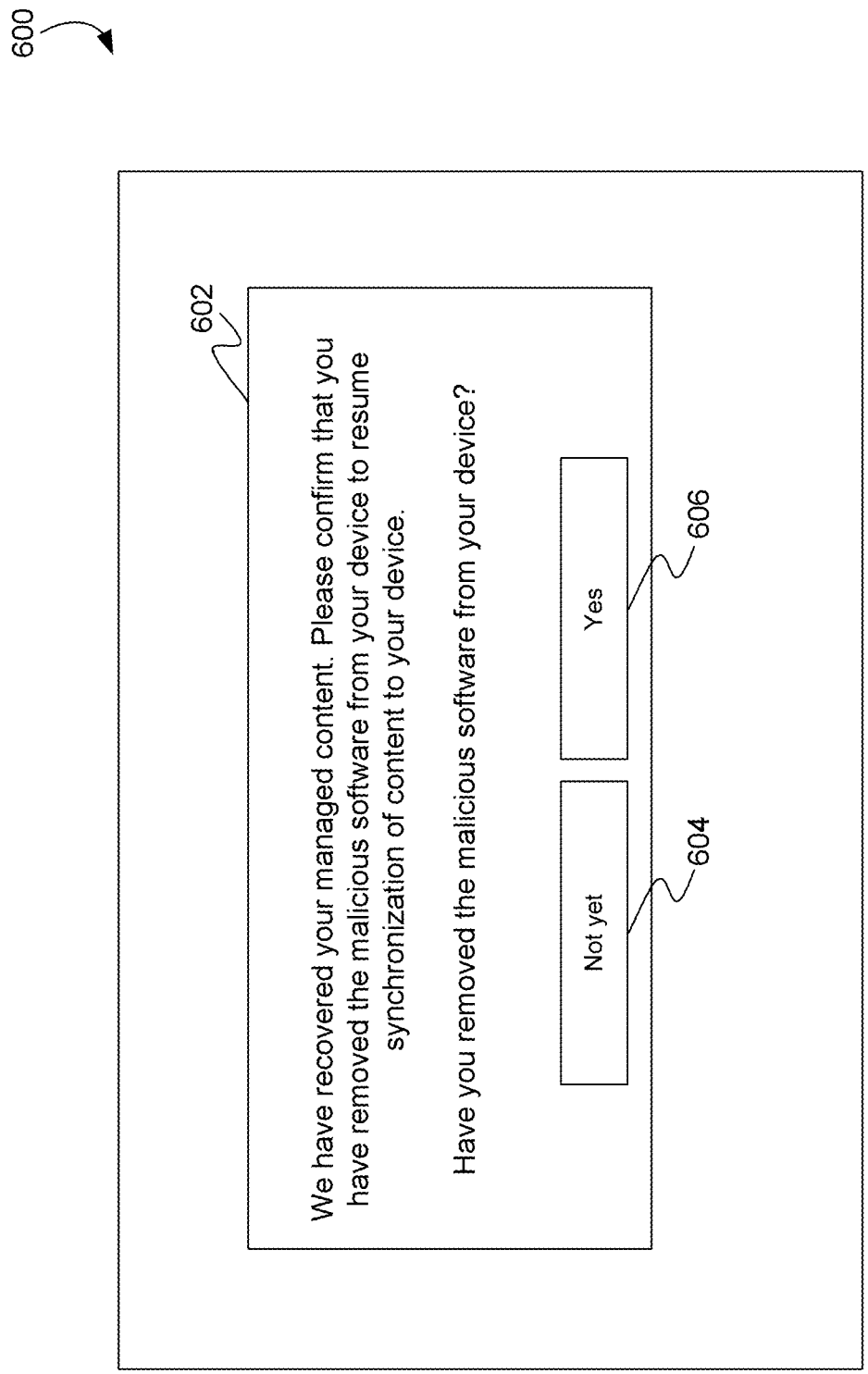
FIG. 6 illustrates an example graphical user interface for resuming suspended synchronization between a client device and a content management system.

FIG. 6 illustrates an example graphical user interface 600 for resuming suspended synchronization between client device 240 and content management system 106. For example, GUI 600 can be presented by CMS client 242 after receiving a message from content management system 106 indicating that content items affected by a ransomware have been recovered by content management system 106. Alternatively, GUI 600 can be presented by an email client, instant messaging client, or other messaging client after receiving a message (e.g., email, instant message, chat message, etc.) from content management system 106 indicating that content items affected by a ransomware have been recovered by content management system 106.

In some implementations, GUI 600 can include notification 602. For example, CMS client 242 (or a messaging client) can present notification 602 in response to receiving a message indicating that content items affected by a malware attack on client device 240 have been recovered by content management system 106. Since content management system 106 suspended synchronization of content items with client device 240 in response to detecting the malware attack, notification 602 can include graphical elements 604 and 606 that allow a user to confirm whether the user has removed the detected malicious software from client device 240. For example, the user can select graphical element 604 to confirm that the malicious software has not been removed from client device 240 and prevent content management system 106 from resuming synchronization of content items with client device 240. For example, in response to receiving a selection of graphical element 604, CMS client 242 can send a message to content management system 106 indicating that synchronization of content items with client device 240 should not be resumed.

Alternatively, the user can select graphical element 606 to confirm that the malicious software has been removed from client device 240 and cause content management system 106 to resume synchronization of content items with client device 240. For example, in response to receiving a selection of graphical element 606, CMS client 242 can send a message to content management system 106 indicating that the malware has been removed from client device 240 and that synchronization of content items with client device 240 should be resumed. Upon receiving confirmation that the malicious software has been removed from client device 240, content management system 106 can resume synchronizing content items with client device 240. Thus, client device 240 can receive the versions of the content items restored by content management system after the detection of the malicious software attack.

Figure 7:
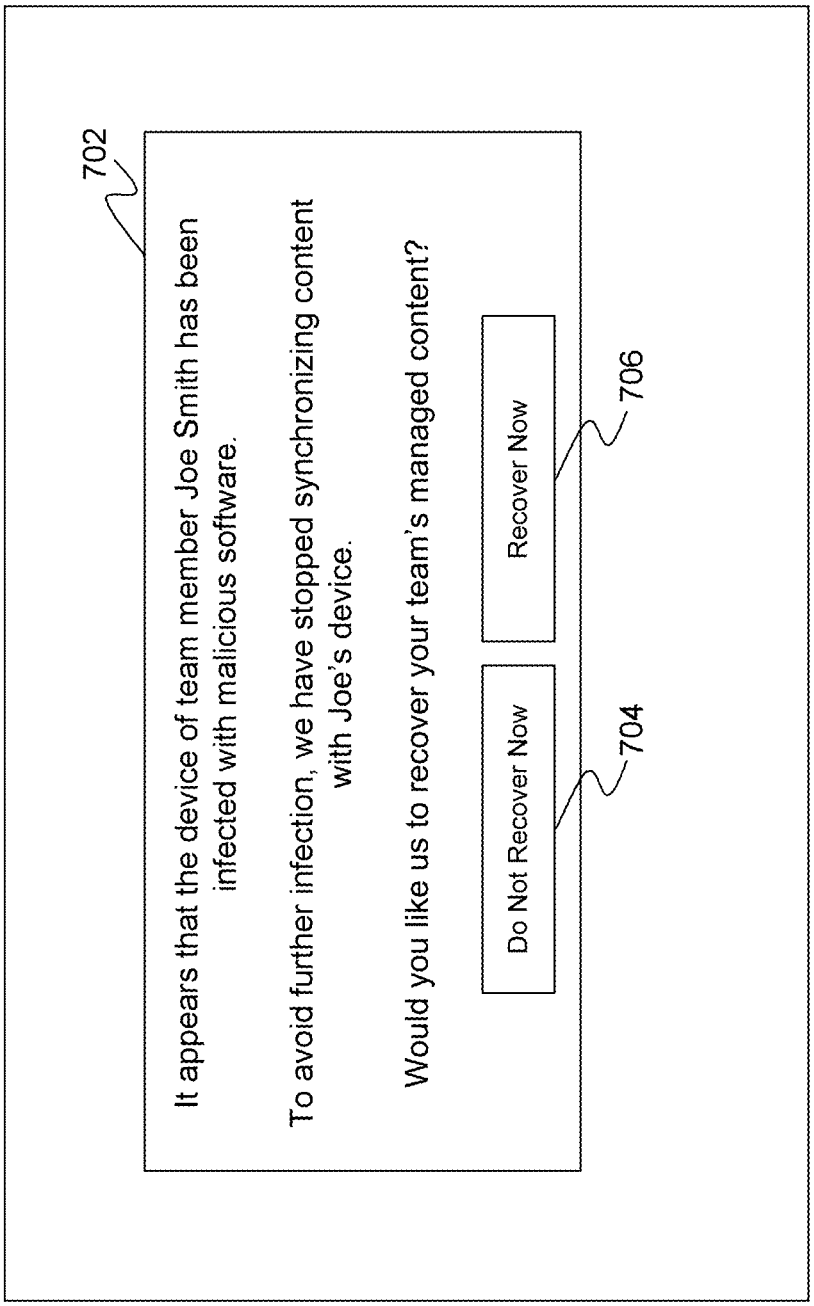
FIG. 7 illustrates an example graphical user interface for recovering content items associated with a team of users.

FIG. 7 illustrates an example graphical user interface 700 for recovering content items associated with a team of users. For example, the user of client device 240 can be a member of a team or project that includes multiple members. Members of the team may have access to the same folders, content items, etc., through shared folders, shared namespaces, and other shared content. The content may be synchronized among the computing devices (e.g., client devices) of each member through content management system 106, as described above. Thus, when the device of one member of a team is attacked by ransomware or some other malicious software, other members of the team may be affected by the results of the attack. For example, if the attack is a ransomware attack that encrypts and deletes content items on one member's device, the same deletions and encryptions of content items can be synchronized with other member's devices such that the other members may not be able to access the encrypted (e.g., ransomed) content items.

In some implementations, content management system 106 can determine when a malicious software attack has occurred on a team member's device. For example, content management system 106 (e.g., detection rule handler 202, infection detection module 204, and scanning module 206) can determine when a ransomware attack has occurred on a team member's device, as described above. For example, if the user of client device 240 is a member of a team, content management system 106 can detect and/or determine when a malware attack has occurred on client device 240, as described above.

In some implementations, content management system 106 can notify a team administrator when a malicious software attack has occurred on a team member's device. For example, when content management system 106 detects a ransomware attack on client device 240, content management system 106 can send a message to the team administrator's device indicating that a malicious software attack has occurred on a team member's device. For example, content management system 106 can send the message as a notification to CMS client 242 running on the administrator's device. Content management system can send the message as an email, instant message, chat message or other type of electronic message to a messaging client running on the administrator's device. When the message is received, the administrator's device (e.g., similar to client device 240) can present a graphical notification describing the malware attack and presenting content item recovery options. In some implementations, the team administrator can perform any of the activities and/or initiate any of the operations available to a user to detect malware and/or recover content items, as described herein.

In some implementations, GUI 700 can include notification 702. For example, notification 702 can be presented on the administrator's device to notify the administrator that a malware attack has occurred on a team member's device. For example, notification 702 can include text indicating that a computing device associated with a member of the administrator's team has been infected with malicious software and that the content management system 106 has stopped or suspended content item synchronization with the affected member's device. For example, content management system 106 can automatically suspend synchronizations with the affected member's device when content management system 106 detects a malware attack, as described above.

In some implementations, GUI 700 can include graphical element 706 for initiating recovery of malware affected content items. For example, when the administrator's device presents notification 702, notification 702 can include selectable graphical element 706 for causing content management system 106 to initiate recovery of malware affected content items. For example, in response to receiving a selection of graphical element 706, the administrator's device can send a message to content management system 106 to cause content management system 106 to initiate recovery of content items that were encrypted or otherwise affected by the malicious software infecting the team member's device (e.g., client device 240). Content management system 106 can then recover the affected content items by restoring the versions of the content items that were the current versions immediately before the malware attack, as described above.

In some implementations, notification 702 can include graphical element 704. For example, the administrator may not wish to recover the affected content items for the affected team member when notification 702 is presented by the administrator's device. The administrator can select graphical element 704 to dismiss notification 702 without causing content management system 106 to recover the affected content items.

In some implementations, content management system 106 can initiate recovery of a team's malware affected content items automatically. For example, in response to detecting a malicious software (e.g., ransomware) attack on a team member's device (e.g., client device 240), content management system 106 may automatically initiate recovery of the malware affected content items to the latest versions of the content items that existed immediately before the malware attack. Content management system 106 can, for example, detect a malware attack has occurred on a team member's (e.g., user's) device, as described above, automatically suspend synchronization of content items to the team member's device (e.g., while continuing synchronizations to other team member's devices), and automatically recover the malware affected content items.

Since synchronizations continue for team member device's that are not infected with the malware, the other team members will automatically receive the recovered content items after content management system 106 recovers the affected content items. However, since synchronizations are suspended for the infected user device, either the team member using the infected device or the team administrator user must confirm that the malware has been removed from the infected device before resuming content item synchronization between the infected device and content management system 106.

Figure 8:
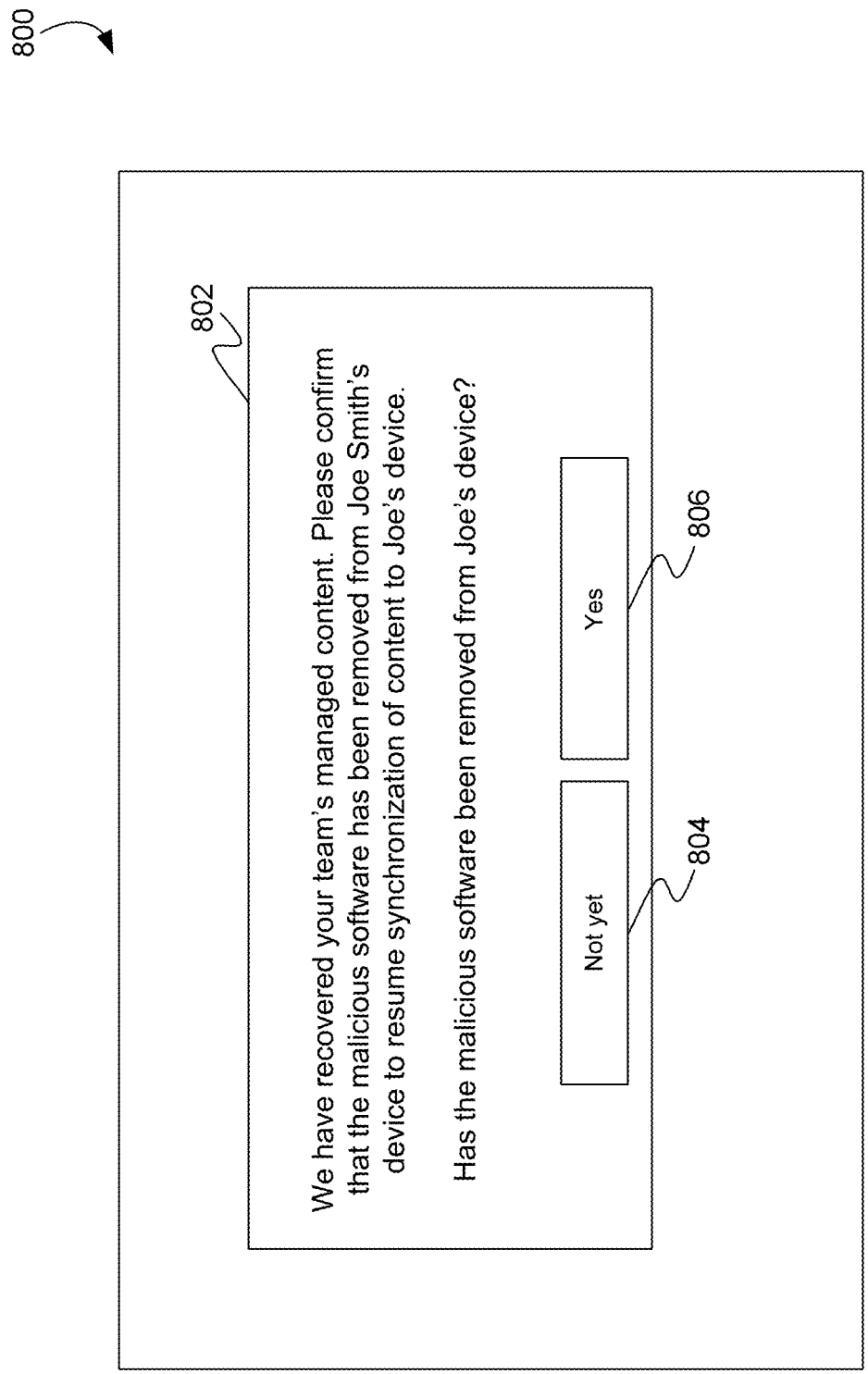
FIG. 8 illustrates a graphical user interface for confirming that malicious software has been removed from an infected client device.

FIG. 8 illustrates a graphical user interface 800 for confirming that malicious software has been removed from an infected client device. For example, GUI 800 can be presented by CMS client 242 on the administrator's device after receiving a message from content management system 106 indicating that content items affected by a ransomware have been recovered by content management system 106. Alternatively, GUI 600 can be presented by an email client, instant messaging client, or other messaging client on the administrator's device after receiving a message (e.g., email, instant message, chat message, etc.) from content management system 106 indicating that content items affected by a ransomware have been recovered by content management system 106.

In some implementations, GUI 800 can include notification 802. For example, CMS client 242 (or a messaging client) on the administrator's device can present notification 802 in response to receiving a message indicating that content items affected by a malware attack on the infected team member's device (e.g., client device 240) have been recovered by content management system 106. Since content management system 106 suspended synchronization of content items with the infected team member's device in response to detecting the malware attack, notification 802 can include graphical elements 804 and 806 that allow the team administrator to confirm whether the affected team member has removed the detected malicious software from the infected device. For example, the administrator can select graphical element 804 to confirm that the malicious software has not been removed from the infected device and prevent content management system 106 from resuming synchronization of content items with the infected device. For example, in response to receiving a selection of graphical element 804, CMS client 242 on the administrator's device can send a message to content management system 106 indicating that synchronization of content items with the infected device should not be resumed.

Alternatively, the administrator can select graphical element 806 to confirm that the malicious software has been removed from the infected device and cause content management system 106 to resume synchronization of content items with the infected device. For example, in response to receiving a selection of graphical element 806, CMS client 242 on the administrator's device can send a message to content management system 106 indicating that the malware has been removed from the team member's infected device and that synchronization of content items with the infected device should be resumed. Upon receiving confirmation that the malicious software has been removed from the infected device, content management system 106 can resume synchronizing content items with the infected device. Thus, the infected device can receive the recovered versions of the content items restored by content management system after the detection of the malicious software attack.

Figure 9:
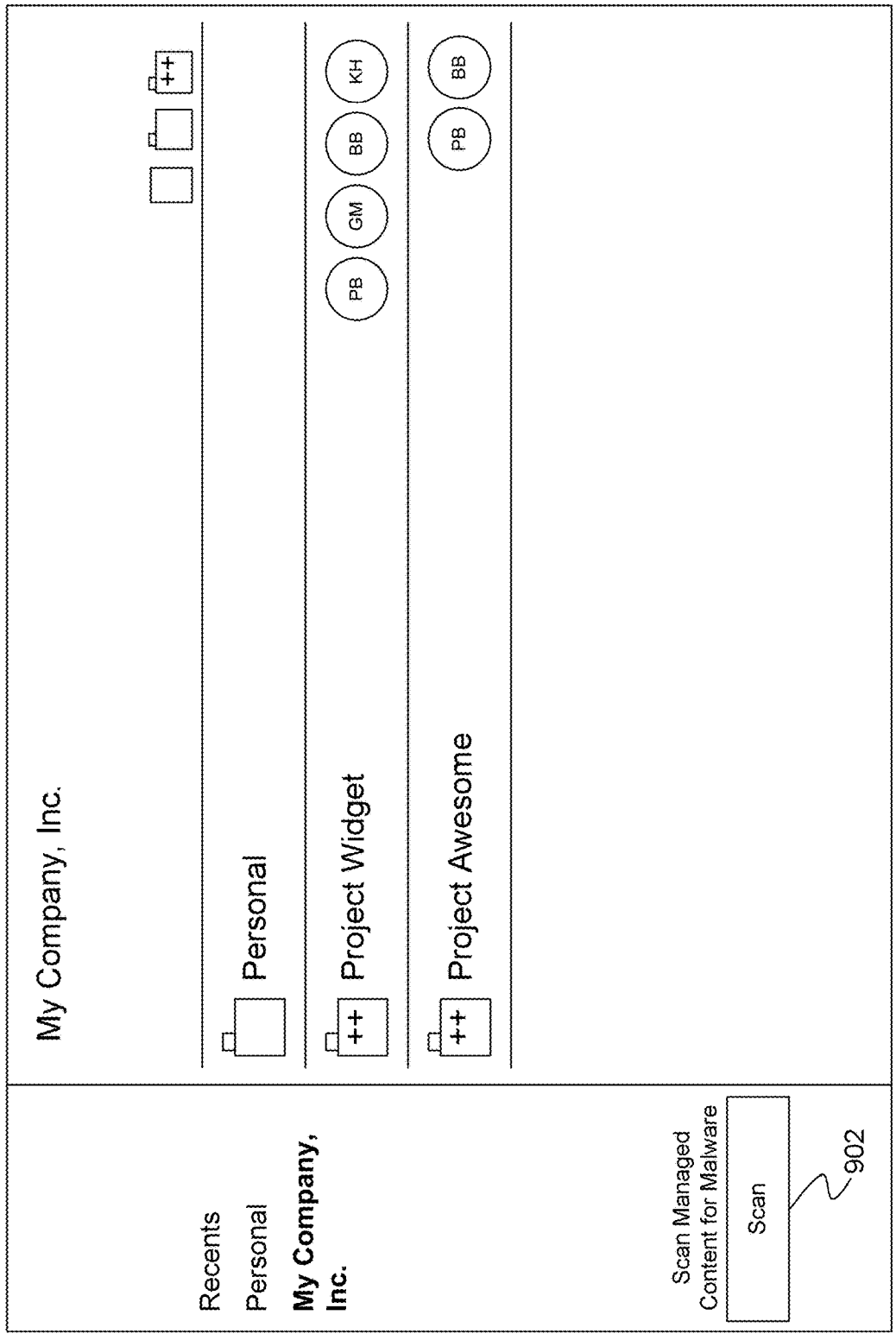
FIG. 9 illustrates an example graphical user interface for initiating a scan to determine whether a client device is infected with malicious software.

FIG. 9 illustrates an example graphical user interface 900 for initiating a scan to determine whether a client device is infected with malicious software. For example, CMS client 242 can present GUI 900 on a display of client device 240.

GUI 900 can be a content item browser that allows the user to navigate content management system 106 to view and interact with content items, folders, namespaces, etc. GUI 900 can be any other user interface presented by CMS client 242.

In some implementations, GUI 900 can include graphical element 902 for initiating a scan of change sets associated with client device 240. For example, while interacting with content management system 106 through GUI 900 and/or while browsing managed content 250 using a local filesystem browser, the user of client device 240 may notice suspicious content items, suspicious changes to client device 240, and/or other suspicious activity on client device 240. Thus, the user may wish to manually initiate a scan of client device 240 so that content management system 106 can determine whether client device 240 has been infected with malicious software. To initiate the scan, the user can select graphical element 902 (e.g., a button). In response to receiving the selection of graphical element 902, CMS client 242 can send a message to content management system 106 requesting that content management system 106 initiate a full scan of the change sets (e.g., change sets 260) associated with client device 240.

In response to receiving the message, content management system 106 can invoke scanning module 206 to initiate the full scan of the change sets associated with client device 240. For example, content management system 106 can provide the identifier for client device 240, the namespaces associated with client device 240, and/or the time of the scan request to scanning module 206. Scanning module 206 can then perform a full scan of the change sets associated with client device 240, as described above.

When content management system 106 determines that client device 240 is infected with malicious software, content management system 106 can send a message to client device 240 indicating that malicious software has been detected on client device 240 as described above with reference to FIG. 5. The user can then cause content management system 106 to recover content items and resume synchronization of content items with client device 240 as described above.

Figure 10:
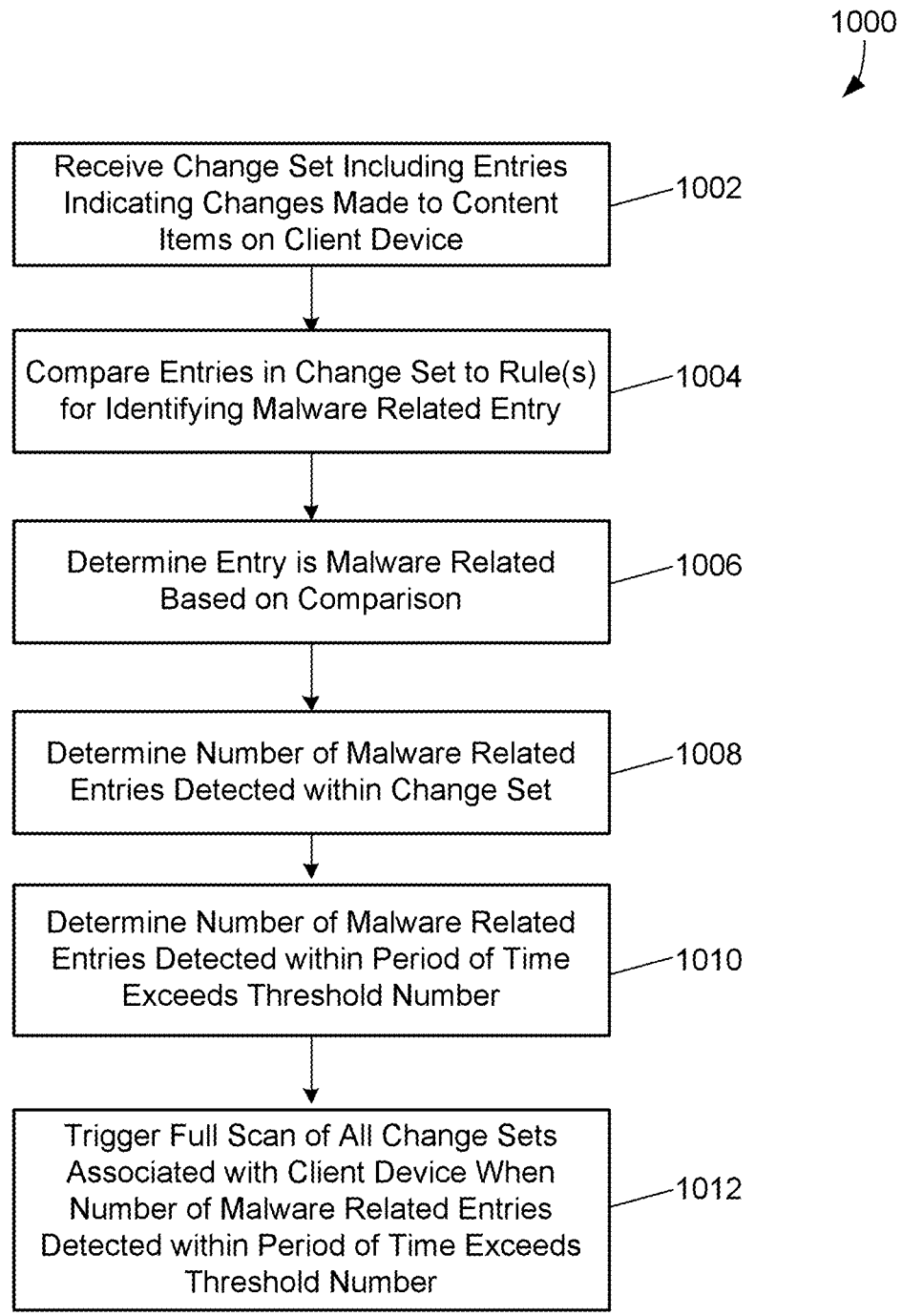
FIG. 10 is a flow diagram of an example process for analyzing individual change sets for suspicious entries.

FIG. 10 is a flow diagram of an example process 1000 for analyzing individual change sets for suspicious entries. For example, process 1000 can be performed by a server device of content management system 106 when a change set is received by content management system 106 from client device 240. For example, process 1000 can be performed by one or more detection rule handler(s) 202 and/or infection detection module 204, as described above.

At step 1002, a server device can receive a change set. For example, content management system 106 can receive a change set from client device 240 indicating changes made to content items on client device 240. For example, the change set can include change entries identifying content items that have been deleted, added, moved, modified, and/or otherwise changed in some way.

At step 1004, the server device can compare entries in the received change set to rules for identifying malware related entries. For example, content management system 106 can include one or more detection rule handlers 202 that compare change set entries in the received change set to malware detection rules for identifying suspicious entries in the received change set, as described above. For example, a rule can specify that when a content item identifier in a change set entry includes a specific string (e.g., name extension, etc.) associated with known malicious software, then the change set entry is a suspicious entry.

At step 1006, the server device can determine a change set entry is a malware related entry based on a comparison of the change set entry to one or more malware detection rules. For example, when a change set entry includes a content item name that includes a string (e.g., content item name, content item extension, etc.) associated with known malicious software, the server device can determine the change set entry is a suspicious change entry. When detection rule handler 202 determines that a change set entry is suspicious, detection rule handler 202 can send a message to infection detection module 204 indicating that a suspicious change entry has been found in the received change set.

At step 1008, the server device can determine the number of malware related entries detected within change set. For example, infection detection module 204 on content management system 106 can receive suspicious change entry messages from detection rule handler(s) 202. Infection detection module 204 can determine how many suspicious change entries exist within a change set based on the number of suspicious change entry messages are received from detection rule handler(s) 202.

At step 1010, the server device can determine that the number of malware related entries detection within a period of time exceeds a threshold number. For example, when the number of suspicious change entry messages received by infection detection module 204 exceeds a threshold number (e.g., 20, 50, 100, etc.) within a period of time (e.g., 2 minutes, 5 minutes, 10 minutes, etc.), then infection detection module 204 can determine that client device 240 is likely infected with malicious software (e.g., malware, ransomware, etc.).

At step 1012, the server device can trigger a full scan of all change sets associated with the client device. For example, infection detection module 204 can trigger a full scan of all change sets associate with client device 240 when the number of malware related entries (e.g., suspicious entries) detected within the period of time exceeds the threshold number of malware related entries.

Figure 11:
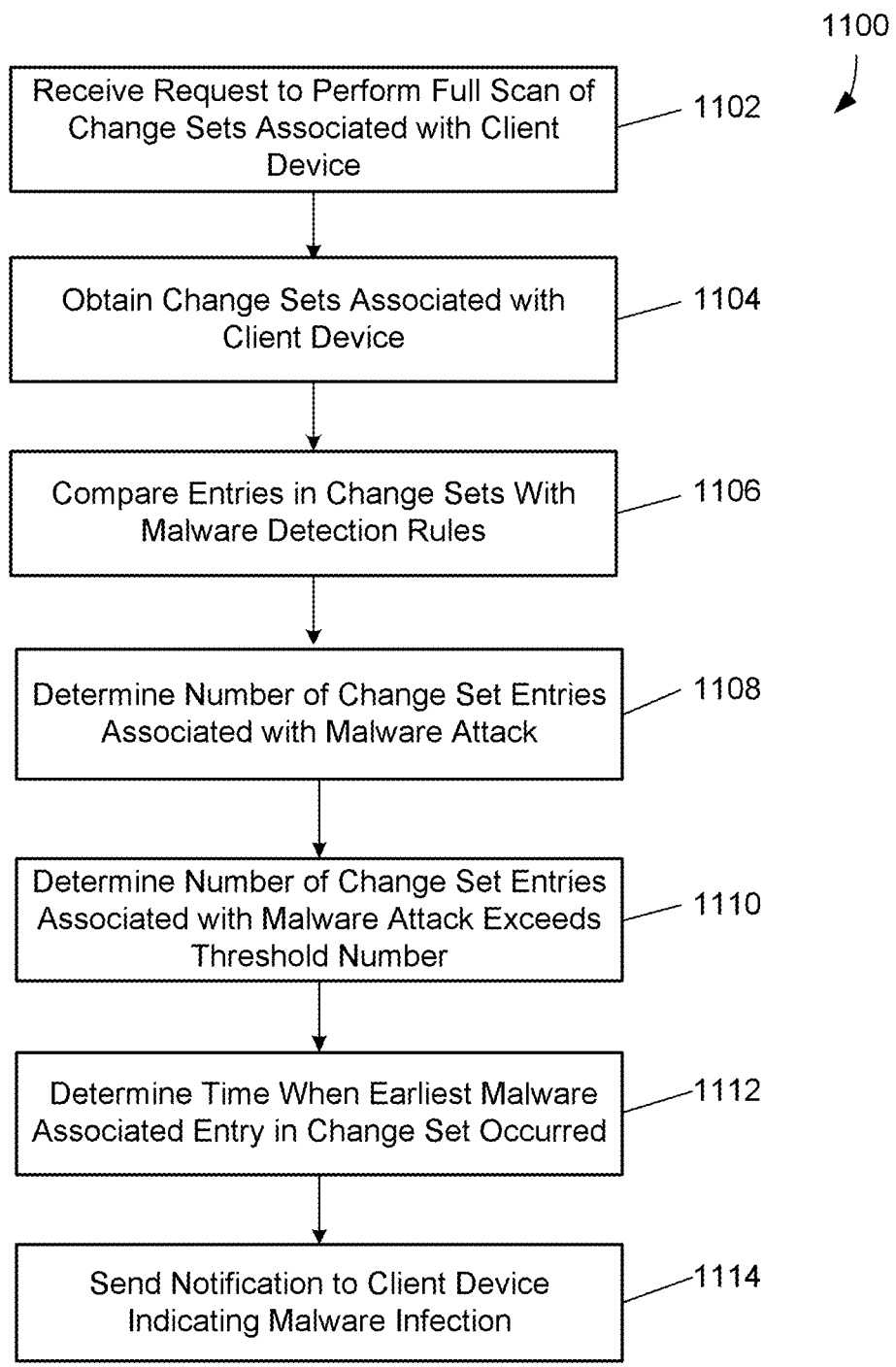
FIG. 11 is a flow diagram of an example process for performing a full scan of change sets associated with a client device.

FIG. 11 is a flow diagram of an example process 1100 for performing a full scan of change sets associated with a client device. For example, a server device associated with content management system 106 can perform process 110 to determine whether or confirm that client device 240 is infected with malicious software. The scan can be performed to determine the extent of the malware infection (e.g., how many and which content items are affected), and to determine when the malware infection started so that the affected content items can be recovered by content management system 106.

At step 1102, a server device can receive a request to perform a full scan of change sets associated with a client device. For example, scanning module 205 on content management system 106 can receive a request from infection detection module 204 to perform a full scan of change sets associated with client device 240. Alternatively, scanning module 206 can receive a scan request from client device 240 when a user of client device 240 selects to manually initiate a scan of client device 240, as described above. For example, each namespace associated with client device 240 can have associated change sets 260. Scanning module 206 can scan each of the namespaces and/or change sets associated with client device 240 when a full scan of client device 240 is requested.

At step 1104, the server device can obtain change sets associated with the client device. For example, scanning module 206 can obtain change sets associated with the namespaces associated with client device 240 from content storage 160. For example, instead of just scanning individual change sets as they are received from client device 240 like detection rule handler(s) 202, scanning module 206 can obtain multiple change sets (e.g., change sets that cover a period of time before and after the scan request) from content storage 260.

At step 1106, the server device can compare entries in change sets with malware detection rules. For example, to determine the scope of the malware attack, scanning module 206 can compare each change entry in the change sets to malware detection rules. As described above, the malware detection rules can include rules for matching content item names (e.g., names, extensions, etc.) to known malware content item names and/or extensions to determine whether a content item is associated with known malicious software. These content items can be, for example, content items that have been modified (e.g., encrypted) and renamed to include known malware content item names and/or name extensions. When comparing the change set entries to malware detection rules, scanning module 206 can move forward in time and/or backward in time comparing the change entries to the malware detection rules to determine when the malware attack started and when the malware attack ended. By determining the start time and end time of the malware attack, scanning module 206 can determine a time period over which the malware attack occurred.

At step 1108, the server device can determine the number of change set entries associated with the malware attack. For example, scanning module 206 can determine, based on the malware detection rules, how many change set entries are associated with malicious software activity. Scanning module 206 can, for example, determine the number of malware-related content items added to client device 140 over the period of time associated with the attack. Scanning module 206 can determine the number of content items deleted over the period of time associated with the malware attack.

At step 1110, the server device can determine the number of change set entries associated with the malware attack exceeds a threshold number. For example, scanning module 206 can confirm that a malware attack occurred when the number of change set entries associated with the malware attack exceeds a threshold number of entries. Alternatively, scanning module 206 can determine a ratio of malware related change entries over total number of change entries (e.g., malware entries/total entries) to confirm that a malware attack has occurred on client device 240. For example, if the ratio of malware change entries over total change entries exceeds a threshold value (e.g., 0.1, 0.3, etc.), then scanning module 206 can confirm that a malware attack has occurred on client device 240.

At step 1112, the server device can determine a time when the earliest malware entry in the change sets occurred. For example, when scanning backward in time through the change set entries and comparing the change sets to the malware detection rules, scanning module 206 can determine and store the timestamp associated with the earliest malware related change set entry.

At step 1114, the server device can send a notification to the client device indicating that the client device has been infected with malware. For example, when scanning module 206 confirms a malware attack has occurred on client device 240, content management system 106 can send a message (e.g., application notification, email, instant message, etc.) to client device 240. When client device 240 receives the message, client device 240 can present a notification informing the user of client device 240 of the malware infection and prompting the user to initiate restoration of the affected content items. Alternatively, content management system 106 can automatically initiate recovery of malware affected content items, as described above.

Figure 12:
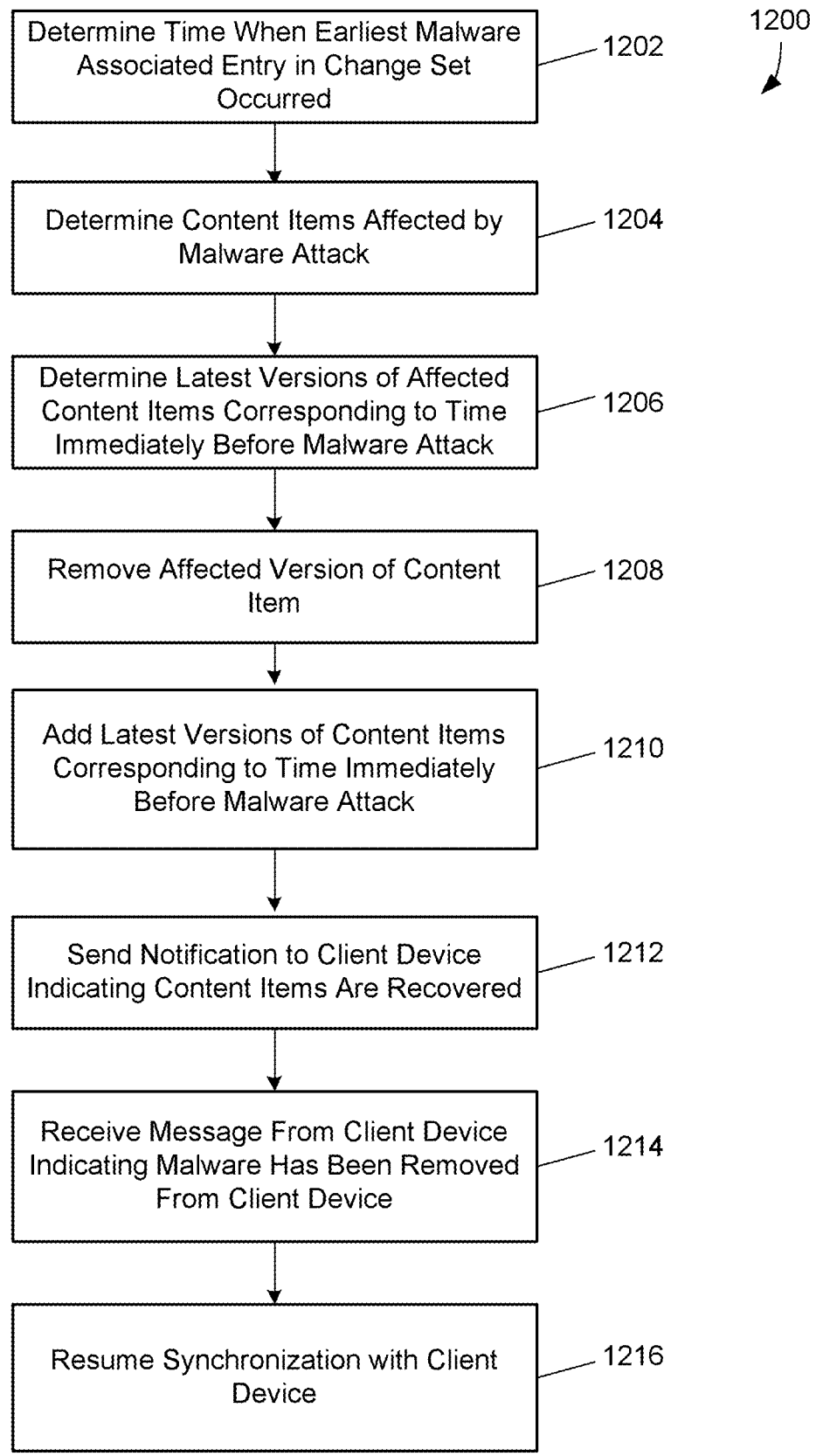
FIG. 12 is a flow diagram of an example process for restoring malware affected content items.

FIG. 12 is a flow diagram of an example process 1200 for restoring malware affected content items. For example, process 1200 can be performed by a server device of content management system 106 to recover content items that have been encrypted, deleted, modified, or otherwise affected by malware on a client device. The server device can perform process 1200 in combination with process 1000 and/or process 1100 to recover content items affected by a malware attack on client device 240.

At step 1202, the server device can determine the time when the earliest malware associated entry in the change sets associated with client device 240. For example, content recovery module 208 can obtain the time of the earliest malware entry from scanning module 208 after scanning module 208 has scanned change sets 260 associated with client device 240.

At step 1204, the server device can determine content items affected by the malware attack. For example, scanning module 206 and/or content recovery module 208 can determine which content items were deleted during the period of the malware attack.

At step 1206, the server device can determine latest versions of content items corresponding to time immediately before malware attack. For example, for each malware affected content item, content recovery module 208 can determine which version of the malware affected content item represents the latest version of the content item at the time immediately before the earliest malware associated entry in the change sets associated with client device 240.

At step 1208, the server device can remove affected versions of the content items from content storage 160. For example, content recovery module 208 can remove content items that have content item names and/or content item extensions associated with known malicious software from the namespaces associated with client device 240.

At step 1210, the server device can add the latest versions of content items corresponding to the time immediately before the malware attack to content storage 160. For example, content recovery module 208 can restore the latest versions of the content items corresponding to the time immediately before the malware attack to the appropriate namespaces associated with client device 240. Content recovery module 208 can restore the content items by adding the appropriate versions of the content items to their respective namespaces.

At step 1212, the server device can send a notification to the infected client device indicating that content items have been recovered. For example, content management system 106 can send an email, instant message, notification, or other electronic message to a messaging client or CMS client 242 on client device 240 to notify the user of client device 240 that the content items have been recovered. The notification can prompt the user to remove the malicious software and/or prompt the user to confirm that the malicious software has been removed from client device 240 so that synchronization of content items between content management system 106 and client device 240 can be resumed.

At step 1214, the server device can receive a message from the client device indicating that the malicious software has been removed from the client device. For example, the user can select a graphical element presented on a display of client device 240 to indicate that the malicious software has been removed from client device 240. Client device 240 can then send a message to content management system 106 indicating that the malicious software has been removed from client device 240.

At step 1216, the server device can resume synchronization of content item with the client device. For example, in response to receiving the message confirming that the malicious software has been removed from client device 240, content management system 106 can resume synchronizing content items with client device 240.

Figure 13A:
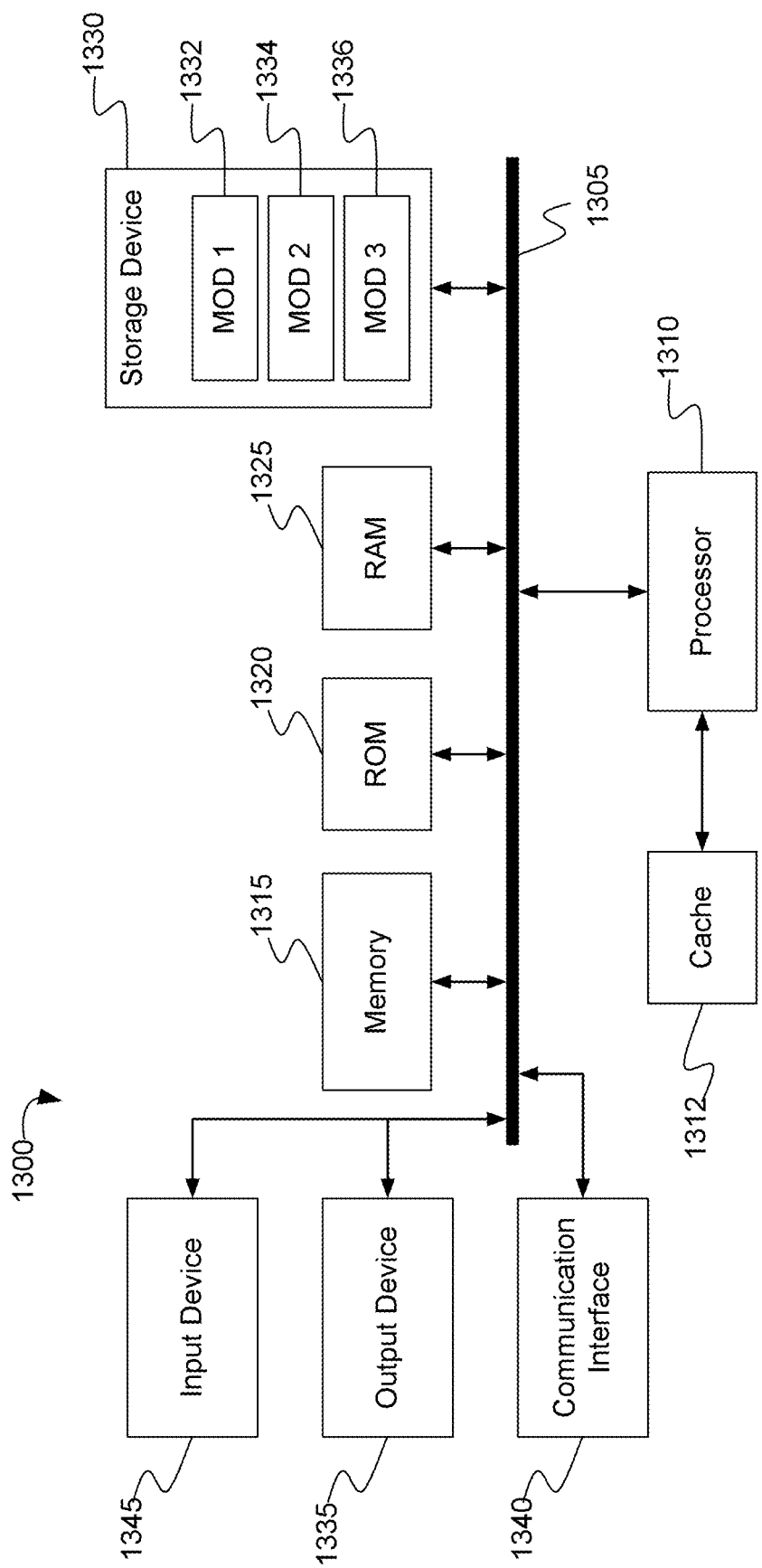
FIG. 13A shows an example possible system embodiment for implementing various embodiments of the present technology.
Figure 13B:
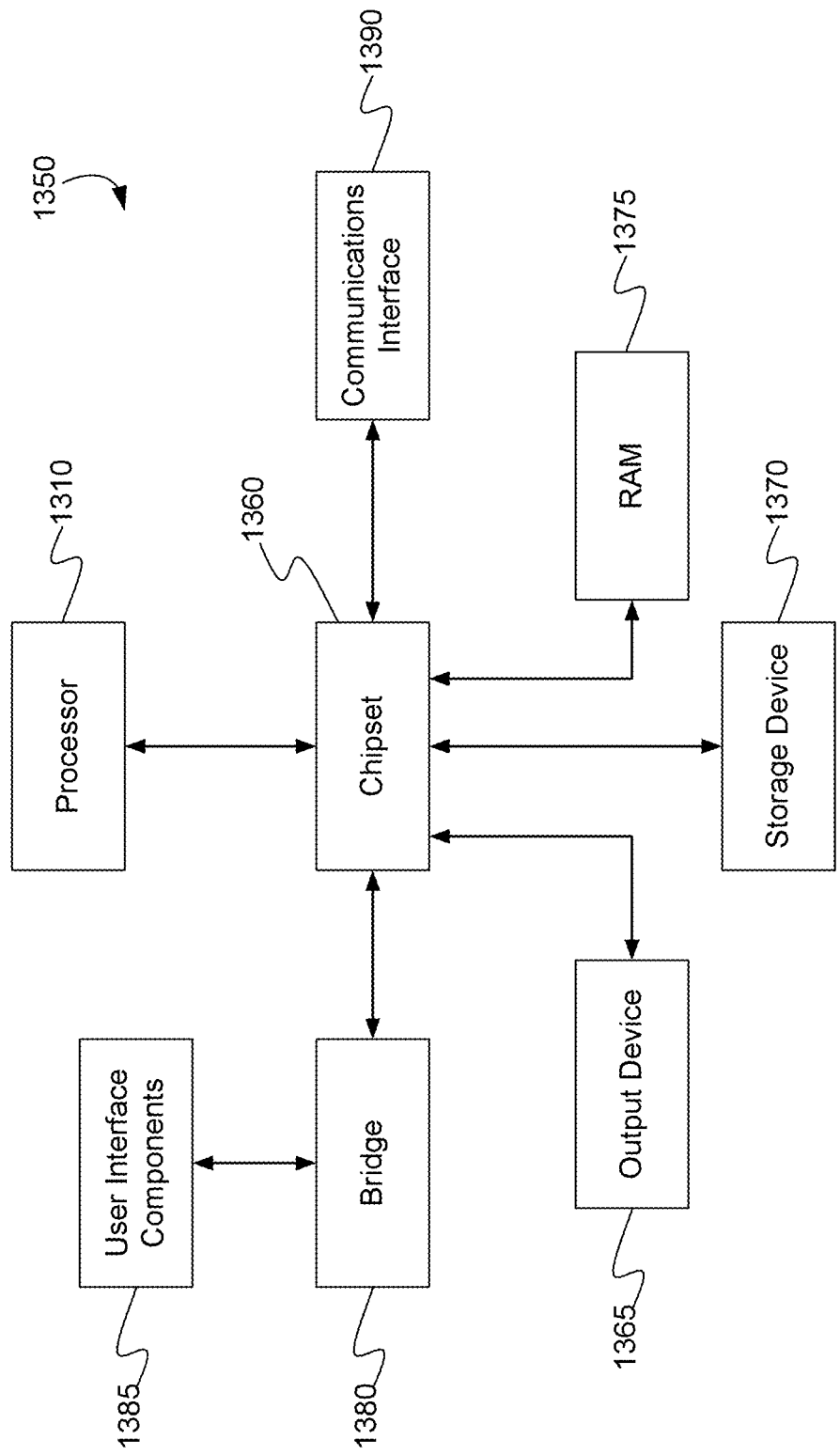
FIG. 13B shows an example possible system embodiment for implementing various embodiments of the present technology.

FIG. 13A and FIG. 13B show example possible system embodiments. The more appropriate embodiment will be apparent to those of ordinary skill in the art when practicing the present technology. Persons of ordinary skill in the art will also readily appreciate that other system embodiments are possible.

FIG. 13A illustrates a conventional system bus computing system architecture 1300 wherein the components of the system are in electrical communication with each other using a bus 1305. Example system 1300 includes a processing unit (CPU or processor) 1310 and a system bus 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware module or software module, such as module 1 1332, module 2 1334, and module 3 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include software modules 1332, 1334, 1336 for controlling the processor 1310. Other hardware or software modules are contemplated. The storage device 1330 can be connected to the system bus 1305. In one aspect, a hardware module that performs a particular function can include the software component stored in a computer-readable medium in connection with the necessary hardware components, such as the processor 1310, bus 1305, display 1335, and so forth, to carry out the function.

FIG. 13B illustrates a computer system 1350 having a chipset architecture that can be used in executing the described method and generating and displaying a graphical user interface (GUI). Computer system 1350 is an example of computer hardware, software, and firmware that can be used to implement the disclosed technology. System 1350 can include a processor 1310, representative of any number of physically and/or logically distinct resources capable of executing software, firmware, and hardware configured to perform identified computations. Processor 1310 can communicate with a chipset 1360 that can control input to and output from processor 1310. In this example, chipset 1360 outputs information to output 1365, such as a display, and can read and write information to storage device 1370, which can include magnetic media, and solid state media, for example. Chipset 1360 can also read data from and write data to RAM 1375. A bridge 1380 for interfacing with a variety of user interface components 1385 can be provided for interfacing with chipset 1360. Such user interface components 1385 can include a keyboard, a microphone, touch detection and processing circuitry, a pointing device, such as a mouse, and so on. In general, inputs to system 1350 can come from any of a variety of sources, machine generated and/or human generated.

Chipset 1360 can also interface with one or more communication interfaces 1390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1310 analyzing data stored in storage 1370 or 1375. Further, the machine can receive inputs from a user via user interface components 1385 and execute appropriate functions, such as browsing functions by interpreting these inputs using processor 1310.

It can be appreciated that example systems 1300 and 1350 can have more than one processor 1310 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, at a content management system from a client device, a change set including change entries describing changes to content contained in content items at the client device, wherein the content items comprise document files and wherein the content management system is configured to apply the described changes to original versions of respective content items;
   storing, by the content management system, the received change set in a repository of change sets;
   comparing, by the content management system, each change entry in the change set to one or more malware detection rules;
   determining, by the content management system, that a threshold number of the change entries in the change set satisfies at least one of the one or more malware detection rules;
   in response to determining that the threshold number of the change entries satisfies at least one of the one or more malware detection rules, determining, by the content management system, that the client device likely has malicious software; and
   initiating a full scan of the stored change sets associated with the client device to confirm that the client device has the malicious software.

2. The method of claim 1, further comprising:
   automatically confirming, by the content management system, that the client device has the malicious software during the full scan of the stored change sets associated with the client device;
   sending a notification to the client device indicating that the client device is infected with the malicious software;
   receiving, by the content management system, instructions to suspend synchronization of content items between the content management system and the client device; and
   in response to receiving the instructions, suspending synchronization of the content items between the content management system and the client device.

3. The method of claim 1, further comprising:
   automatically determining, by the content management system, content items affected by the malicious software.

4. The method of claim 3, further comprising:
   automatically determining, by the content management system, a start time corresponding to a first change entry associated with the malicious software; and
   restoring, by the content management system, a previous version of each content item affected by the malicious software, the previous version corresponding to a latest version of the corresponding content item that existed immediately before the start time.

5. The method of claim 4, wherein restoring the previous version of each content item affected by the malicious software includes:
   automatically restoring, by the content management system, the previous version of each content item affected by the malicious software, the previous version corresponding to the latest version of the corresponding content item that existed immediately before the start time.

6. The method of claim 2, further comprising:
   receiving, by the content management system, a message from the client device indicating that the malicious software is removed from the client device; and
   in response to receiving the message, resuming synchronization of the content items between the content management system and the client device.

7. The method of claim 1, further comprising:
   sending, by the content management system, a first message indicating that the client device is infected with the malicious software;
   receiving, by the content management system, a second message indicating that the content management system should restore content items affected by the malicious software; and
   restoring, by the content management system, a previous version of each content item affected by the malicious software, the previous version corresponding to a latest version of the corresponding content item that existed immediately before a start time corresponding to a first change entry associated with the malicious software.

8. A non-transitory computer readable medium including one or more sequences of instructions that, when executed by one or more processors, cause the one or more processors to perform operations comprising:
receiving, at a content management system from a client device, a change set including change entries describing changes to content contained in content items at the client device, where the client device is associated with a first user in a team of users of the content management system, wherein the content items comprise document files and wherein the content management system is configured to apply the described changes to original versions of respective content items;
storing, by the content management system, the received change set in a repository of change sets;
comparing, by the content management system, each change entry in the change set to one or more malware detection rules, where the comparing is performed by a plurality of rule handlers, including a first rule handler for comparing each change set entry to a first malware detection rule and a second rule handler for comparing each change set entry to a second malware detection rule that is different than the first malware detection rule;
determining, by the content management system, that a threshold number of the change entries in the change set satisfies at least one of the one or more malware detection rules;
in response to determining that the threshold number of the change entries satisfies at least one of the one or more malware detection rules, determining, by the content management system, that the client device likely has malicious software; and
initiating a full scan of the stored change sets associated with the client device to confirm that the client device has the malicious software.

9. The non-transitory computer readable medium of claim 8, where the instructions cause the processors to perform operations comprising:
automatically confirming, by the content management system, that the client device has the malicious software during the full scan of the stored change sets associated with the client device; and
in response to confirming that the client device has the malicious software, sending a message to the first user and an administrator user for the team of users indicating that the client device has the malicious software;
receiving a second message indicating that the administrator user wishes to suspend synchronization of content items between the content management system and the client device; and
in response to receiving the second message, suspending synchronization of content items between the content management system and the client device.

10. The non-transitory computer readable medium of claim 8, where the instructions cause the processors to perform operations comprising:
automatically determining, by the content management system, content items affected by the malicious software.

11. The non-transitory computer readable medium of claim 10, where the instructions cause the processors to perform operations comprising:
automatically determining, by the content management system, a start time corresponding to a first change entry associated with the malicious software; and
restoring, by the content management system, a previous version of each content item affected by the malicious software, the previous version corresponding to a latest version of the corresponding content item that existed immediately before the start time.

12. The non-transitory computer readable medium of claim 11, wherein the restoring is performed in response to receiving a request from an administrator user of the team of content management system users to restore the previous version of each content item affected by the malicious software.

13. The non-transitory computer readable medium of claim 9, where the instructions cause the processors to perform operations comprising:
receiving, by the content management system, a further message from the administrator user indicating that the malicious software is removed from the client device; and
in response to receiving the further message, resuming synchronization of the content items between the content management system and the client device.

14. The non-transitory computer readable medium of claim 8, where the instructions cause the processors to perform operations comprising:
sending, by the content management system, a first message indicating that the client device is infected with the malicious software;
receiving, by the content management system, a second message indicating that an administrator user of the team of users of the content management system wishes to restore content items affected by the malicious software; and
restoring, by the content management system, a previous version of each content item affected by the malicious software, the previous version corresponding to a latest version of the corresponding content item that existed immediately before a start time corresponding to a first change entry associated with the malicious software.

15. A content management system comprising:
one or more processors; and
a non-transitory computer readable medium including one or more sequences of instructions that, when executed by the one or more processors, cause the processors to perform operations comprising:
receiving, at the content management system from a client device, a change set including change entries describing changes to content contained in content items synchronized with a user account on the content management system, wherein the content items comprise document files and the content management system is configured to apply the described changes to original versions of respective content items, and wherein the client device is authorized on the user account, the change set independent from the content items;
storing, by the content management system, the received change set in a repository of change sets;
comparing, by the content management system, each change entry in the change set to one or more malware detection rules;
determining, by the content management system, that a threshold number of the change entries in the change set satisfies at least one of the malware detection rules;
in response to determining that the threshold number of the change entries satisfies at least one of the malware detection rules, determining, by the content management system, that the client device likely has malicious software.

16. The content management system of claim 15, where the instructions cause the one or more processors to perform operations comprising:
   automatically confirming, by the content management system, that the client device has malicious software during a full scan of the stored change sets associated with the client device; and
   in response to confirming that the client device has the malicious software, automatically suspending synchronization of the content items between the content management system and the client device.

17. The content management system of claim 15, where the instructions cause the one or more processors to perform operations comprising:
   automatically determining, by the content management system, content items affected by the malicious software.

18. The content management system of claim 17, where the instructions cause the processors to one or more perform operations comprising:
   automatically determining, by the content management system, a start time corresponding to a first change entry associated with the malicious software; and
   restoring, by the content management system, a previous version of each content item affected by the malicious software, the previous version corresponding to a latest version of the corresponding content item that existed immediately before the start time.

19. The content management system of claim 18, where the instructions cause the one or more processors to perform operations comprising:
   in response to determining that the client device likely has the malicious software, initiating a full scan of the stored change sets associated with the client device to confirm that the client device has the malicious software.

20. The content management system of claim 16, where the instructions cause the one or more processors to perform operations comprising:
   receiving, by the content management system, a message associated with the user account indicating that the malicious software is removed from the client device; and
   in response to receiving the message, resuming synchronization of the content items between the content management system and the client device.

21. The content management system of claim 15, where the instructions cause the one or more processors to perform operations comprising:
   sending, by the content management system, a first message to the client device indicating that the client device is infected with the malicious software;
   receiving, by the content management system, a second message indicating that a user of the client device wishes to restore content items affected by the malicious software; and
   restoring, by the content management system, a previous version of each content item affected by the malicious software, the previous version corresponding to a latest version of the corresponding content item that existed immediately before a start time corresponding to a first change entry associated with the malicious software.

* * * * *